United States Patent
Sato et al.

(10) Patent No.: US 7,818,289 B2
(45) Date of Patent: Oct. 19, 2010

(54) NETWORK CONTROL SYSTEM, NETWORK CONTROL METHOD, AND COMPUTER PRODUCT

(75) Inventors: Mitsuhiro Sato, Fukuoka (JP); Katsunari Togasaki, Fukuoka (JP); Masayoshi Kamada, Fukuoka (JP); Koji Jitsui, Fukuoka (JP)

(73) Assignee: FUJITSU Limited, Kawasaki (JP)

( * ) Notice: Subject to any disclaimer, the term of this patent is extended or adjusted under 35 U.S.C. 154(b) by 568 days.

(21) Appl. No.: 11/943,650

(22) Filed: Nov. 21, 2007

(65) Prior Publication Data

US 2008/0140630 A1   Jun. 12, 2008

(30) Foreign Application Priority Data

Dec. 11, 2006   (JP) .............................. 2006-333798

(51) Int. Cl.
   G06F 17/30   (2006.01)
(52) U.S. Cl. ...................................... 707/602; 707/770
(58) Field of Classification Search ................. 707/602, 707/770
   See application file for complete search history.

(56) References Cited

U.S. PATENT DOCUMENTS

| | | | | |
|---|---|---|---|---|
| 5,963,976 A | * | 10/1999 | Ogawa et al. | ............... 711/148 |
| 6,343,324 B1 | * | 1/2002 | Hubis et al. | ................. 709/229 |
| 7,017,016 B2 | * | 3/2006 | Chujo et al. | ................. 711/147 |
| 7,346,801 B2 | * | 3/2008 | Brunelle et al. | ................ 714/4 |
| 7,516,189 B2 | * | 4/2009 | Ookubo | ..................... 709/214 |
| 2004/0153711 A1 | * | 8/2004 | Brunelle et al. | ................ 714/4 |

FOREIGN PATENT DOCUMENTS

| | | |
|---|---|---|
| JP | 6-325093 | 11/1994 |
| JP | 11-120190 | 4/1999 |

* cited by examiner

*Primary Examiner*—Cheryl Lewis
(74) *Attorney, Agent, or Firm*—Katten Muchin Rosenman LLP

(57) ABSTRACT

A shared storage device stores therein a correspondence between data retrieved by data collectors bys previously searching a data controller and a search target data identification (ID) for searching the data controller. The data collector first accesses the shared storage device and uses the search target data ID to search the shared storage device. Upon corresponding data being stored in the shared storage device, the data collector retrieves the data and transmits the retrieved data and the search target data ID to a load-dispersing device. Upon the corresponding data not being stored in the shared storage device, the data collector uses the search target data ID to search the data controller. After retrieving the data from the data controller, the data collector transmits to the load-dispersing device and further transmits to the shared storage device, the read data and the search target data ID used to search the data controller.

7 Claims, 19 Drawing Sheets

| SEARCH TARGET DATA ID | DATA | | |
|---|---|---|---|
| | DATA NAME | TIMING | COUNTER VALUE |
| | | ⋮ | ⋮ |
| X | TRANSMISSION COUNT | 09:38 | 2170 |
| | | 09:39 | 2200 |
| | | 09:40 | 2190 |
| | | ⋮ | ⋮ |
| | | ⋮ | ⋮ |
| Y | RECEIPT COUNT | 09:38 | 1900 |
| | | 09:39 | 1890 |
| | | 09:40 | 1880 |
| | | ⋮ | ⋮ |
| ⋮ | ⋮ | ⋮ | ⋮ |

FIG.5

| SEARCH TARGET DATA ID | DATA | | |
|---|---|---|---|
| | DATA NAME | TIMING | COUNTER VALUE |
| A | TRANSMISSION COUNT | ⋮ | ⋮ |
| | | 12:59 | 2530 |
| | | 13:00 | 2520 |
| | | 13:01 | 2530 |
| | | ⋮ | ⋮ |
| B | RECEIPT COUNT | ⋮ | ⋮ |
| | | 12:59 | 1800 |
| | | 13:00 | 1790 |
| | | 13:01 | 1780 |
| | | ⋮ | ⋮ |
| ⋮ | ⋮ | ⋮ | ⋮ |

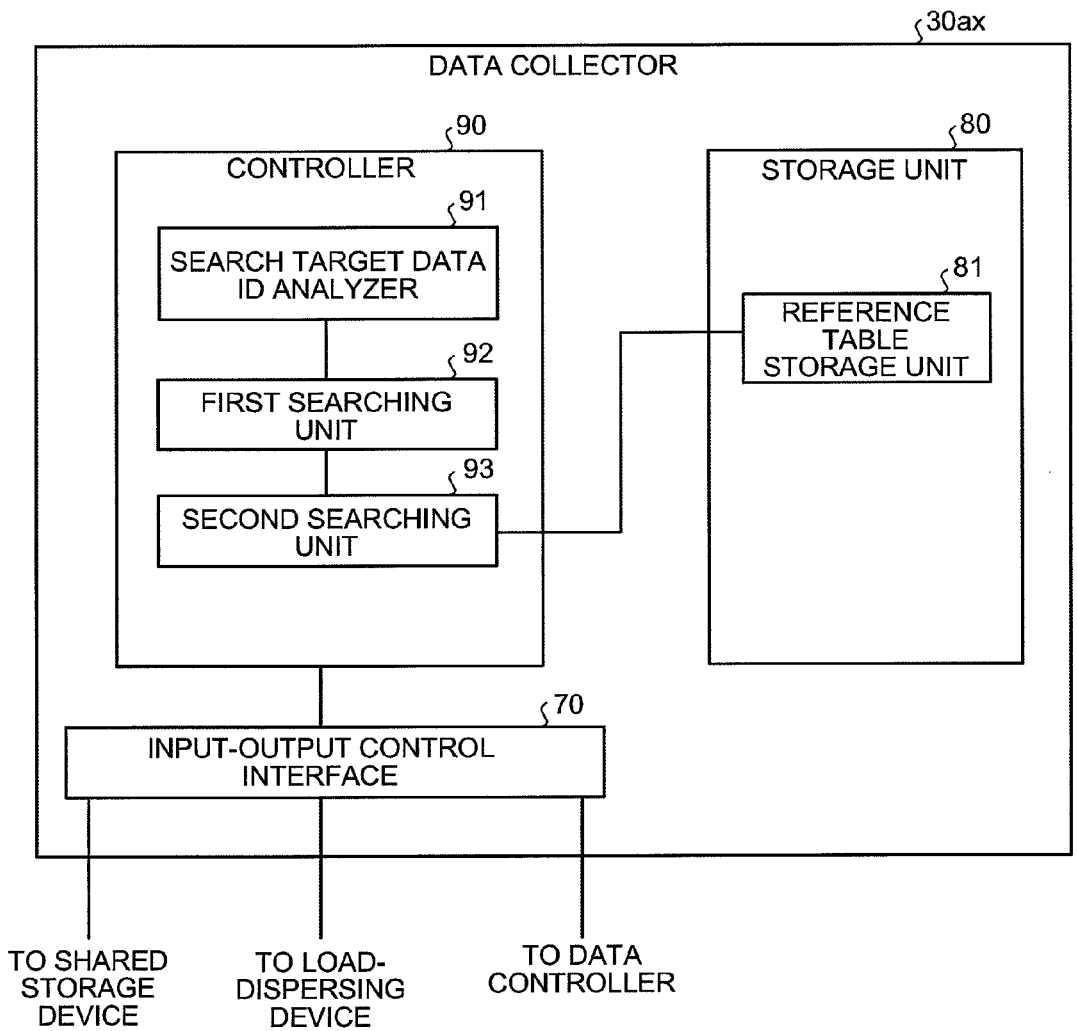

| SEARCH TARGET DATA ID | DATA CONTROLLER IDENTIFICATION DATA | REPRESENTATION FLAG |
|---|---|---|
| A | 00-E0-00-00-12-01 | OFF |
| B | 00-E0-00-00-12-01 | ON |
| C | 00-E0-00-00-12-01 | OFF |
| D | 00-E0-00-00-12-02 | OFF |
| E | 00-E0-00-00-12-02 | OFF |
| F | 00-E0-00-00-12-02 | ON |
| G | 00-E0-00-00-12-03 | OFF |
| ⋮ | ⋮ | ⋮ |

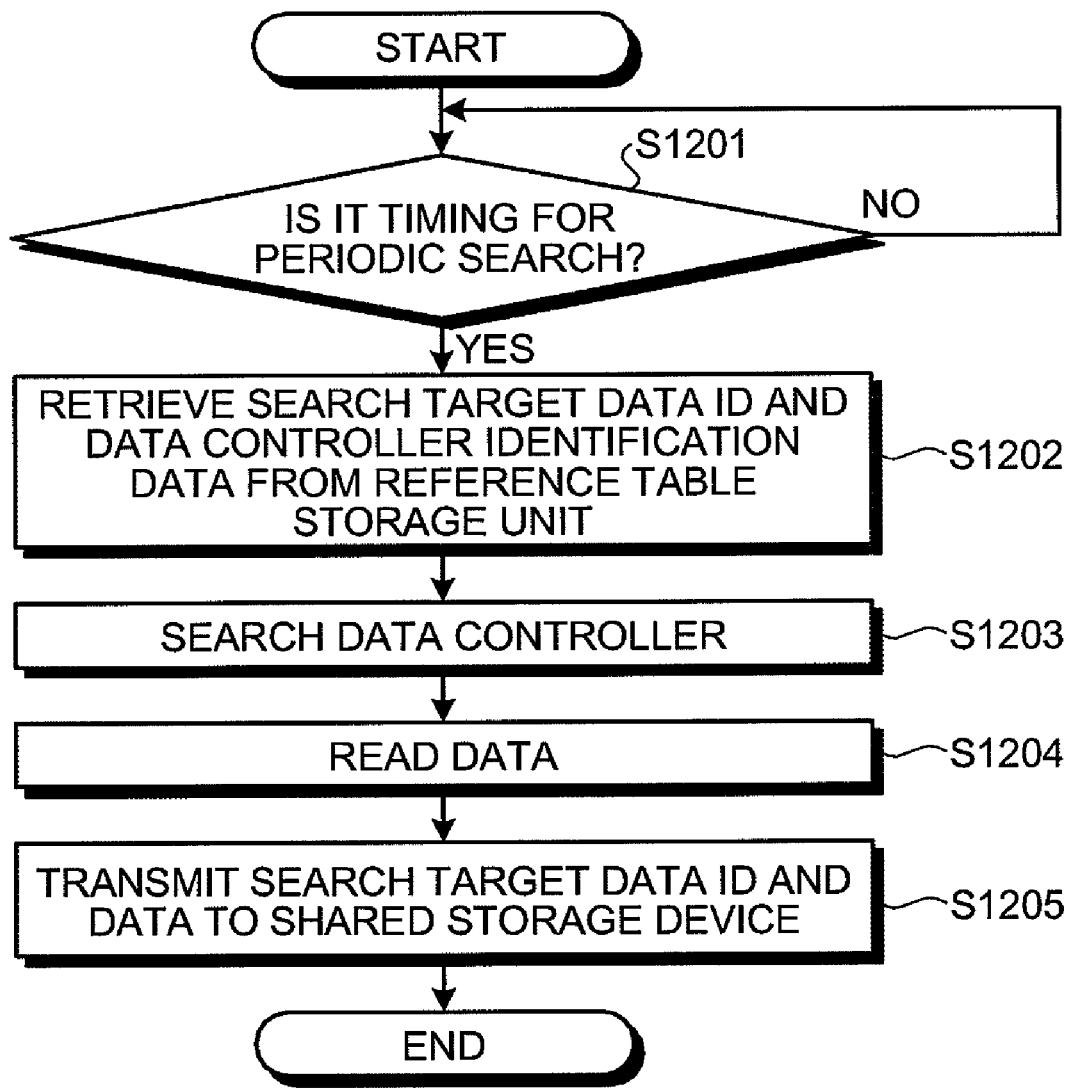

FIG.15

| SEARCH TARGET DATA ID | DATA CONTROLLER IDENTIFICATION DATA | REPRESENTATION FLAG | LATEST RECEIPT TIMING |
|---|---|---|---|
| A | 00-E0-00-00-12-01 | OFF | — |
| B | 00-E0-00-00-12-01 | ON | 12:38 |
| C | 00-E0-00-00-12-01 | OFF | — |
| D | 00-E0-00-00-12-02 | OFF | — |
| E | 00-E0-00-00-12-02 | OFF | — |
| F | 00-E0-00-00-12-02 | ON | 12:31 |
| G | 00-E0-00-00-12-03 | OFF | — |
| ⋮ | ⋮ | ⋮ | ⋮ |

FIG.19A

| DATA COLLECTOR IDENTIFICATION DATA |
|---|
| 00-G0-00-00-13-01 |
| 00-G0-00-00-13-02 |
| 00-G0-00-00-13-03 |
| 00-G0-00-00-13-04 |
| 00-G0-00-00-13-05 |

FIG.19B

| DATA COLLECTOR IDENTIFICATION DATA |
|---|
| 00-G0-00-00-13-01 |
| 00-G0-00-00-13-02 |
| 00-G0-00-00-13-03 |
| 00-G0-00-00-13-04 |
| 00-G0-00-00-13-05 |
| 00-G0-00-00-13-06 |

FIG.19C

| DATA COLLECTOR IDENTIFICATION DATA |
|---|
| 00-G0-00-00-13-01 |
| 00-G0-00-00-13-02 |
| 00-G0-00-00-13-04 |
| 00-G0-00-00-13-05 |

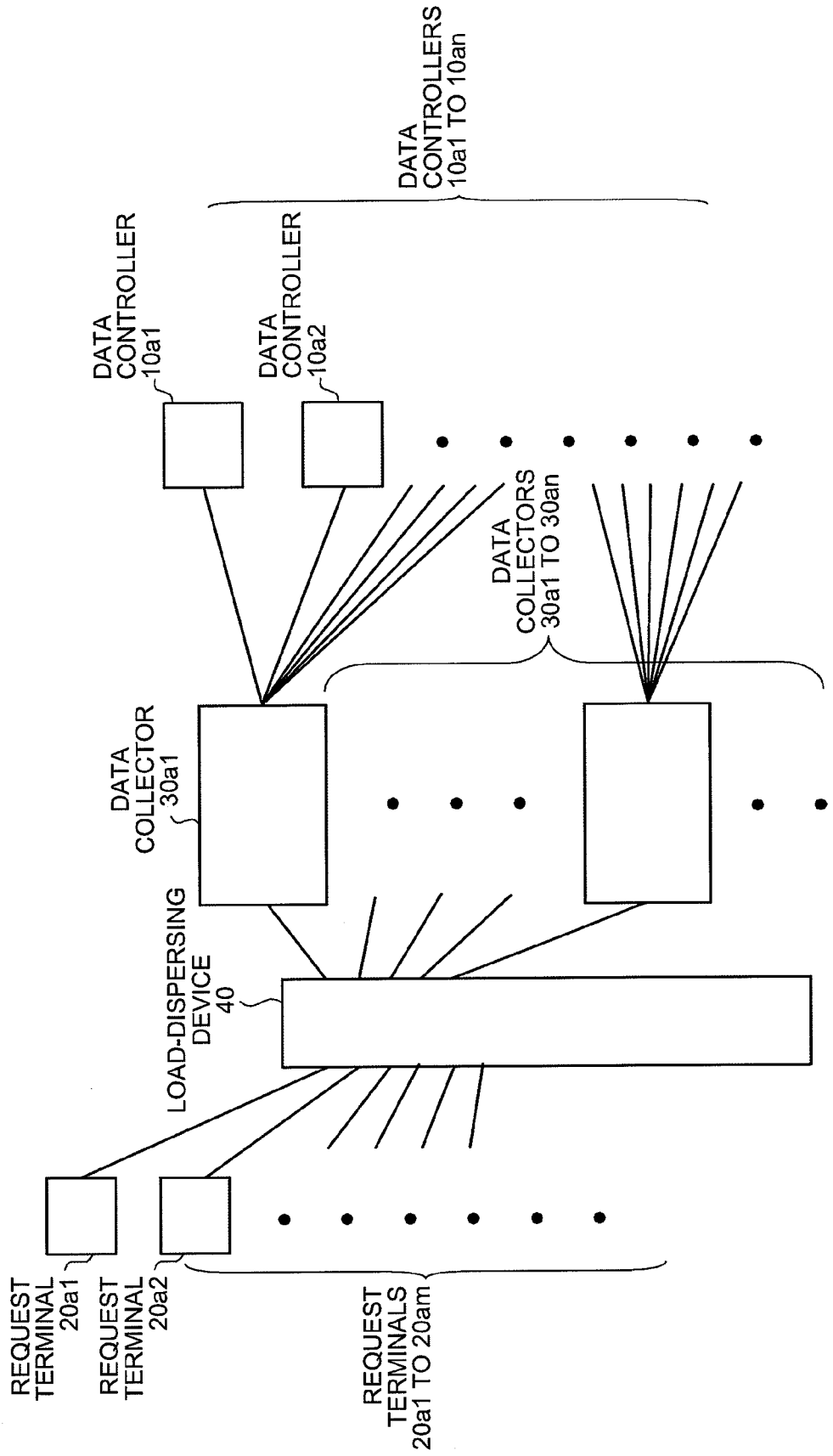

NETWORK CONTROL SYSTEM, NETWORK CONTROL METHOD, AND COMPUTER PRODUCT

BACKGROUND OF THE INVENTION

1. Field of the Invention

The present invention relates to a network control system, a network control method, and a computer product that effectively carry out a searching process.

2. Description of the Related Art

Technologies have been suggested which enable, upon receiving a large number of search conditions from a plurality of users, to combine the search conditions that can be combined and to carry out a collective search instead of using the respective search condition to carry out the search separately.

For example, in a method disclosed in Japanese Patent Application Laid-open No. H11-120190, a searching process is carried out on a plurality of text files that include a hierarchical structure due to a description using SGML (Standard Generalized Mark-up Language). In other words, upon receiving the search conditions that use a combination of an entry name that indicates a layer of a hierarchy and a keyword that is included in a text file that is indicated by the entry name, when searching the text files that satisfy the search conditions, the method mentioned earlier efficiently processes a large number of the search conditions received from the users. To be specific, the entry name of the search condition is treated as a new entry name by using an entry name that is in a lower layer of the hierarchy than the entry name, a search condition is generated using a combination of the entry name and the keyword, and the overlapped search conditions are combined into a single new search condition. Thus, the multiple search conditions are efficiently processed.

Further, in a method that is disclosed in Japanese Patent Application Laid-open No. H6-325093, the same search conditions are integrated and the searching process of the same content is not executed repeatedly. In other words, in the searching process that is called a reserved search and that is carried out by a data searching system, new data is sequentially added to the data searching system. A terminal prior receives the search conditions and uses the received search conditions to execute the search whenever the new data is added. In the reserved search, the same search conditions, among the prior received search conditions, are integrated and the searching process of the same content is not executed repeatedly.

Further, in a network control system that is explained in detail below, upon receiving a large number of the search conditions from the multiple users, data collectors included in the network control system combine the search conditions that can be combined to realize the searching process that carries out a collective search.

To be specific, as shown in FIG. 22, the network control system includes data controllers $10a1$ to $10an$ that store therein data that is a search target, request terminals $20a1$ to $20am$ that execute various processes according to instructions from the users, data collectors $30a1$ to $30ak$ that search from the data controllers $10a1$ to $10an$, data that matches the search conditions, and a load-dispersing device 40 that disperses a searching process load of the data collectors $30a1$ to $30ak$.

In the network control system, upon receiving the search conditions via an input unit from the users, a request terminal $20ax$ transmits the search conditions to the load-dispersing device 40.

Upon receiving the search conditions from the request terminal $20ax$, the load-dispersing device 40 selects a destination data collector $30ax$ such that the searching process load is equally shared by all the data collectors $30a1$ to $30ak$, and transmits the search conditions to the selected data collector $30ax$. In other words, the load-dispersing device 40 equally transmits the search conditions to the data collectors $30a1$ to $30ak$ to ensure that a receipt count of the search conditions in the data collectors $30a1$ to $30ak$ is not biased for a prolonged time period.

Upon receiving the search conditions from the load-dispersing device 40, based on the search conditions, the data collector $30ax$ accesses a data controller $10ax$, reads search target data that indicates data that matches with the search conditions, and transmits the read search target data to the load-dispersing device 40. Upon receiving the search target data from the data collector $30ax$, the load-dispersing device 40 transmits the search target data to the request terminal $20ax$ that is a destination of the search conditions corresponding to the search target data. Finally, upon receiving the search target data from the load-dispersing device 40, the request terminal $20ax$ responds to a user request by generating a predetermined screen in a display unit.

However, the searching process in the network control system mentioned earlier is inefficient. In other words, although a load-dispersing device reduces the searching process load of each data collector by equally transmitting the search conditions, sometimes the load-dispersing device transmits the same search conditions to the multiple data collectors. Due to this, the searching process is carried out by the multiple data collectors and is overlapped. The searching process cannot be carried out efficiently even if the searching process is carried out by using the methods mentioned earlier.

SUMMARY OF THE INVENTION

It is an object of the present invention to at least partially solve the problems in the conventional technology.

According to an aspect of the present invention, a network control system includes a data controller that stores therein search target data representing a search target; a request terminal that outputs identification data uniquely identifying the search target data and retrieves the search target data corresponding to the identification data; a plurality of data collectors that retrieve the search target data from the data controller by using the identification data output from the request terminal; a load-dispersing device that relays the identification data and the search target data between the request terminal and the data collectors; and a shared storage device that receives the identification data and the search target data from the data collectors and establishes and stores therein a correspondence between the identification data and the search target data. Each of the data collectors includes a shared storage device searching unit that searches the shared storage device by using the identification data received from the load-dispersing device, the shared storage device searching unit retrieving the search target data from the shared storage device, and transmitting the retrieved search target data to the load-dispersing device, when the search target data corresponding to the identification data is stored in the shared storage device; a data controller searching unit that searches the data controller by using the identification data, retrieves the search target data corresponding to the identification data, and transmits the retrieved search target data to the load-dispersing device, when the search target data is not stored in the shared storage device at the time of searching by the shared storage device searching unit; and a storage requesting unit that transmits to the shared storage device, the search target data retrieved by the data controller searching unit and the identification data corresponding to the search target data, and requests the shared storage device to establish and store therein a correspondence between the search target data and the identification data.

According to another aspect of the present invention, a method is for controlling a network control system. The network control system includes a data controller that stores therein search target data representing a search target; a request terminal that outputs identification data uniquely identifying the search target data and retrieves the search target data corresponding to the identification data, a plurality of data collectors that retrieve the search target data from the data controller by using the identification data output from the request terminal; a load-dispersing device that relays the identification data and the search target data between the request terminal and the data collectors; and a shared storage device that receives the identification data and the search target data from the data collectors and establishes and stores therein a correspondence between the identification data and the search target data. The method includes searching the shared storage device by using the identification data received from the load-dispersing device; when the search target data corresponding to the identification data is stored in the shared storage device, retrieving the search target data from the shared storage device, and transmitting the retrieved search target data to the load-dispersing device; when the search target data is not stored in the shared storage device at the time of searching for the shared storage device, searching the data controller by using the identification data, retrieving the search target data corresponding to the identification data from the data controller, and transmitting the retrieved search target data to the load-dispersing device; transmitting to the shared storage device, the search target data retrieved from the data controller and the identification data corresponding to the search target data; and requesting the shared storage device to establish and store therein a correspondence between the search target data and the identification data.

According to still another aspect of the present invention, a computer-readable recording medium stores therein a computer program that implements the above method on a computer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a schematic of an example of data that is stored by a shared storage device;

FIG. 6 is a block diagram of a data collector according to the first embodiment;

FIG. 7 is a schematic of an example of data that is stored in a reference table storage unit;

FIG. 12 is a flowchart of a periodic searching process performed by the data collector according to the second embodiment;

FIG. 15 is a schematic of an example of data that is stored by the reference table storage unit;

FIGS. 19A to 19C are schematics of an example of data that is stored by a transmission table storage unit;

FIG. 22 is a schematic for explaining a commonly used network control system.

DETAILED DESCRIPTION OF THE PREFERRED EMBODIMENTS

Figure 1:
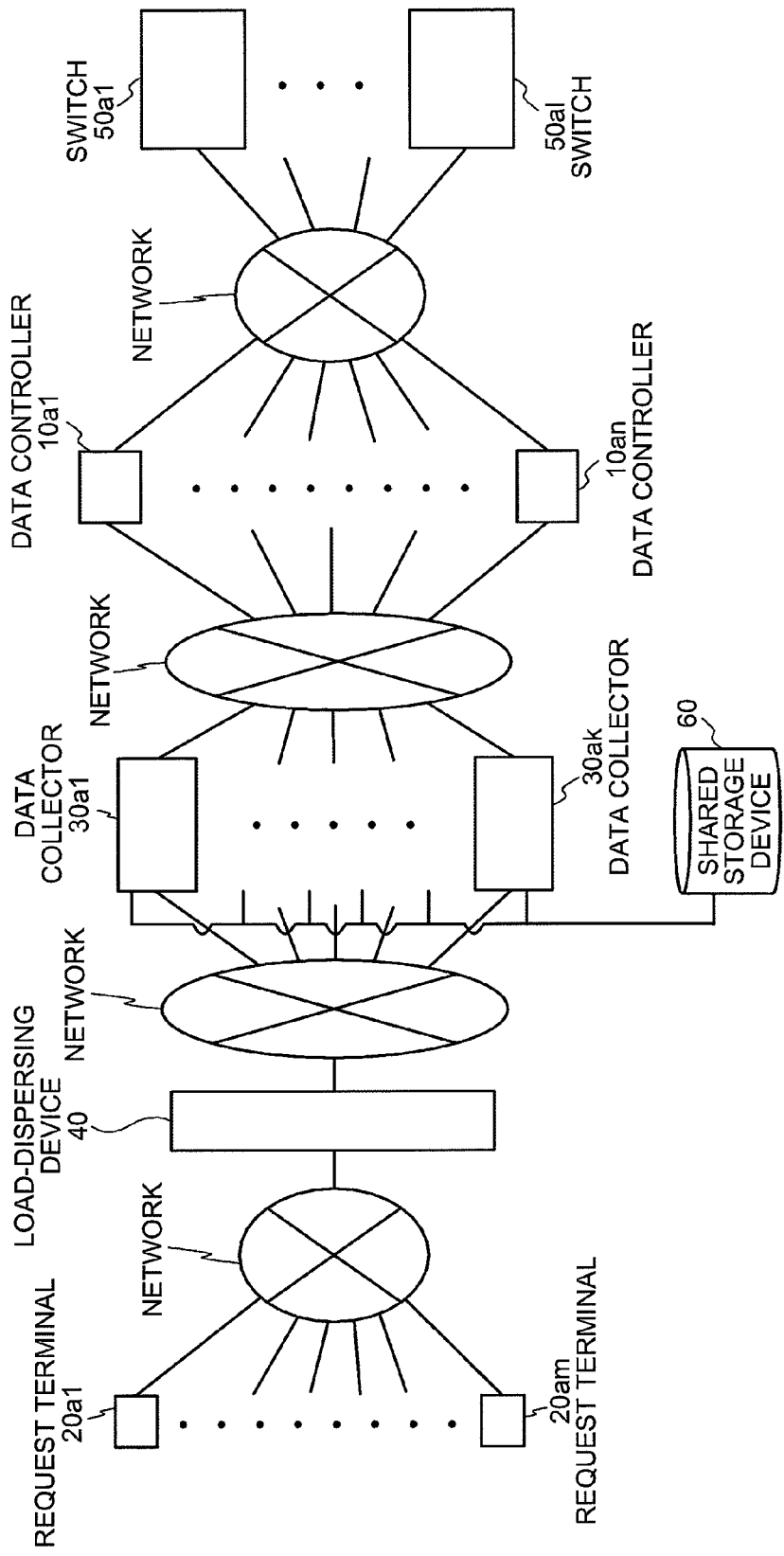
FIG. 1 is a schematic for explaining an overview and a salient feature of a network control system according to a first embodiment of the present invention.

Exemplary embodiments of the network control system according to the present invention are explained below with reference to the accompanying drawings. Below, an overview and a salient feature of a network control system according to a first embodiment of the present invention, a structure and a process sequence of a data collector in the network control system according to the first embodiment, and effects of the first embodiment are sequentially explained. Next, an overview of a data collector according to a second embodiment of the present invention, a structure and a process sequence of the data collector according to the second embodiment, and effects of the second embodiment are sequentially explained. Next, an overview of a data collector according to a third embodiment of the present invention, a structure and a process sequence of the data collector according to the third embodiment, and effects of the third embodiment are sequentially explained. Next, an overview of a network control system according to a fourth embodiment of the present invention, a structure of a load-dispersing device in the network control system according to the fourth embodiment, and effects of the fourth embodiment are sequentially explained. Other embodiments are explained in the end.

A main terminology used in the embodiments is explained first. "Search target data identification (ID)" (corresponds to "identification data" described in claims) used in the embodiments indicates data that uniquely corresponds to each data when a storage device such as a database stores therein the data. The storage device such as the database identifies multiple data by establishing a correspondence between a unique identification data and the respective data.

"Data" (corresponds to "search target data" described in claims) used in the embodiments indicates various blocks of data that are generated by a switch for each fixed time period and includes data name, a counter value, and a timing when the counter value is retrieved. The counter value indicates an integration count when a predetermined phenomenon occurs inside the switch for each fixed time period. A graph is generated by plotting the counter value per minute in a two dimensional coordinate that includes "counter value" as a vertical axis and "timing of counter value retrieval" as a horizontal axis.

Further, "data controller" (corresponds to "data controller" described in claims) indicates a storage device that establishes and stores therein a correspondence between a large number of data and the search target data ID. The data controller establishes and stores therein a correspondence between the data (the data name, the timing, and the counter value) and the search target data ID (see FIG. 3 for example). The data controller receives latest data from the switch via a network for each predetermined time period, and similarly establishes and stores therein a correspondence between the received data and the search target data ID.

Further, "request terminal" (corresponds to "request terminal" described in claims) indicates a data processor that executes various processes according to instructions from a user. The request terminal receives the search target data ID from an input unit and retrieves via the network, the data that corresponds to the search target data ID from the data that is stored by the data controller.

Further, "data collector" (corresponds to "data collector" described in claims) indicates a data processor that searches the large number of data that are stored in the data controller and reads or retrieves data that corresponds to a predetermined search target data ID. Upon receiving via a predetermined communication path, the search target data ID that is received by the request terminal, the data collector accesses the data controller, reads or retrieves the data corresponding to the search target data ID, and transmits the read or retrieved data to the request terminal (the request terminal receives the data from the data collector via a predetermined communication path without receiving the data directly from the data collector).

Further, "load-dispersing device" (corresponds to "load-dispersing device" described in claims) indicates an intermediary device that executes various processes for reducing a process load of the data collector. The load-dispersing device equally distributes the search target data ID that is received from the request terminal. Further, the load-dispersing device transmits the data received from the data collector to the request terminal that has requested the data.

The overview and the salient feature of the network control system according to the first embodiment are explained with reference to FIGS. 1 to 2C. FIG. 1 is a schematic for explaining the overview of the network control system according to the first embodiment. FIGS. 2A to 2C are schematics for explaining the salient feature of the network control system according to the first embodiment.

As shown in FIG. 1, the network control system includes request terminals 20a1 to 20am, a load-dispersing device 40, data collectors 30a1 to 30ak, data controllers 10a1 to 10an, and switches 50a1 to 50a1 that are communicably connected to each other via the network (a public telephone network, the Internet, or a local area network (LAN)). The data collectors 30a1 to 30ak are connected to a shared storage device 60 by an exclusive cable.

Figures 3, 4:
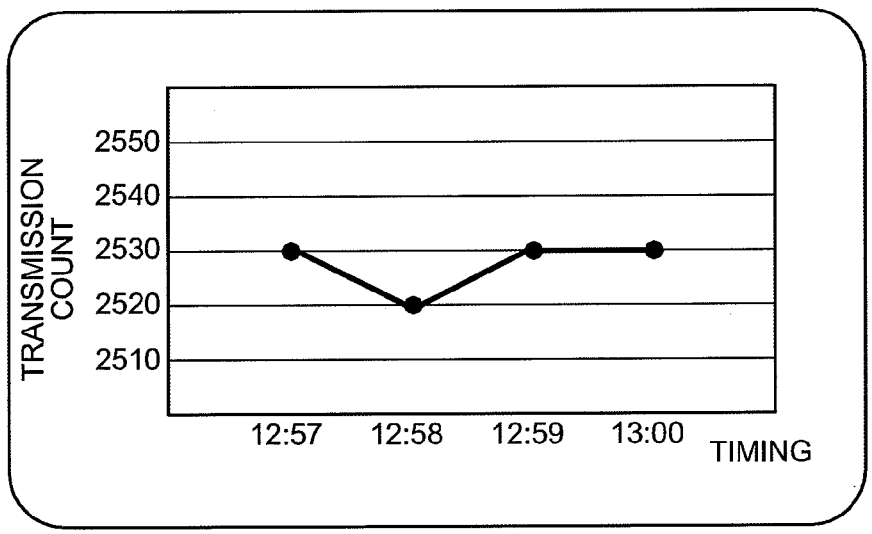
FIG. 3 is a schematic of an example of data that is stored in a data controller.
FIG. 4 is a schematic of an example of a graph that is displayed in a display by a request terminal.

In the network control system, the data controllers 10a1 to 10an receive data from the switches 50a1 to 50a1 via the network and establish and store therein a correspondence between the received data and the search target data ID. For example, as shown in FIG. 3, a data controller 10ax establishes and stores therein a correspondence between data (having a data name "transmission count", a timing "09:38", and a counter value "2170") that is received from a switch 50ax and a search target data ID "X". FIG. 3 is a schematic of an example of the data that is stored in the data controller.

Upon a request terminal 20ax transmitting the search target data ID, a data collector 30ax receives the search target data ID via the load-dispersing device 40. Next, the data collector 30ax uses the search target data ID to search the data controller 10ax, reads or retrieves the data corresponding to the search target data ID, and transmits the read or retrieved data. The request terminal 20ax similarly receives the transmitted data via the load-dispersing device 40. As shown in FIG. 4, upon receiving the data, the request terminal 20ax displays a graph in a display. The overview of the network control system according to the first embodiment is thus explained. Enabling to efficiently carry out a searching process is the salient feature of the network control system according to the first embodiment. FIG. 4 is a schematic of an example of the graph that is displayed in the display by the request terminal.

The salient feature of the network control system is explained next. The shared storage device 60 receives the search target data ID and the data from the data collectors 30a1 to 30ak and establishes and stores therein a correspondence between the search target data ID and the data. To be specific, as shown in FIG. 2A, the shared storage device 60 establishes and stores therein a correspondence between the data that is read by the data collectors 30a1 to 30ak by previously searching the data controllers 10a1 to 10an and the search target data ID that are used for searching the data (see (1) of FIG. 2A). For example, as shown in FIG. 5, the shared storage device 60 establishes and stores therein a correspondence between the data (having the data name "transmission count", the timing "12:59", and the counter value "2530") that is previously searched and read by the data collector 30ax and the a search target data ID "A". FIG. 5 is a schematic of an example of data that is stored by a shared storage device.

The data collectors 30a1 to 30ak use the search target data ID received from the load-dispersing device 40 to search the shared storage device 60. If the data corresponding to the search target data ID is stored in the shared storage device 60, the data collectors 30a1 to 30ak read the data from the shared storage device 60 and transmit the read data to the load-dispersing device 40.

Figure 2A:
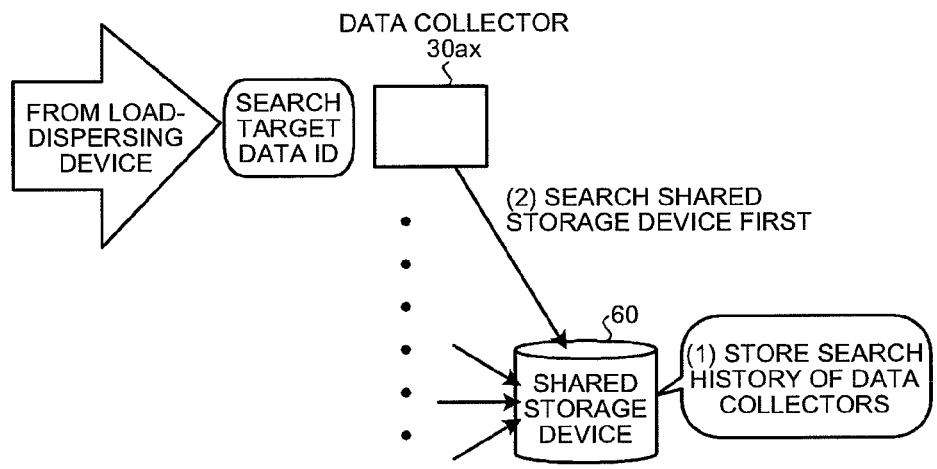
FIGS. 2A to 2C are schematics for explaining the overview and the salient feature of the network control system according to the first embodiment.

To be specific, as shown in FIG. 2A, upon receiving the search target data ID from the load-dispersing device 40 via the network, the data collector 30ax accesses the shared storage device 60 and uses the search target data ID to search the shared storage device 60 (see (2) of FIG. 2A).

Figure 2B:
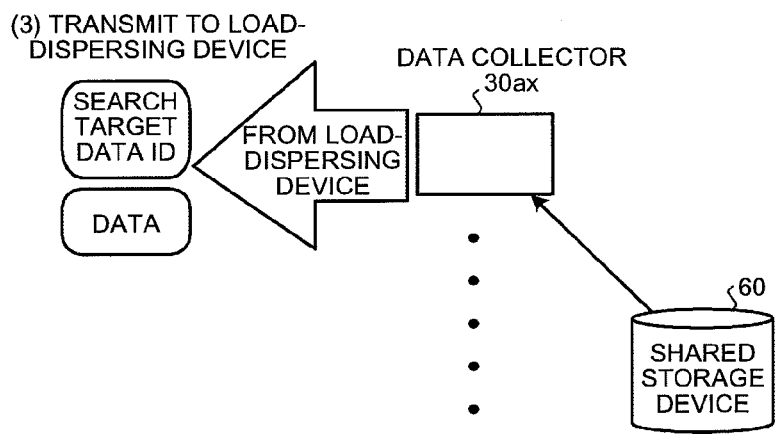

Next, as shown in FIG. 2B, if the search target data ID and the data corresponding to the search target data ID are stored (if another data collector 30ay, including the data collector 30ax itself, has used the same search target data ID to search a data controller 10ay) in the shared storage device 60, the data collector 30ax reads or retrieves the data and transmits the read or retrieved data and the search target data ID to the load-dispersing device 40 (see (3) of FIG. 2B).

If the search target data ID is not stored in the shared storage device 60, the data collectors 30a1 to 30ak use the search target data ID to search the data controllers 10a1 to

10an, read or retrieve the data corresponding to the search target data ID, and transmit the read or retrieved data to the load-dispersing device 40.

Figure 2C:
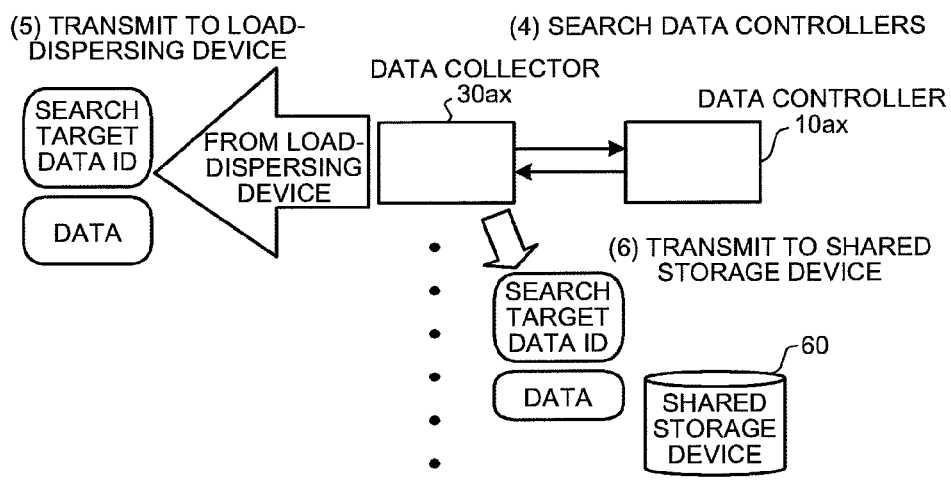

To be specific, as shown in FIG. 2C, if the search target data ID is not stored in the shared storage device 60 (if a previous search using the same search target data ID is not carried out), the data collector 30ax accesses the data controller 10ax via the network and searches the data controller 10ax using the search target data ID (see (4) of FIG. 2C). Next, the data collector 30ax reads the data from the data controller 10ax and transmits the read data and the search target data ID to the load-dispersing device 40 (see (5) of FIG. 2C).

Upon reading or retrieving the data from the data controller 10ax, the data collector 30ax transmits the read or retrieved data and the search target data ID corresponding to the read or retrieved data to the shared storage device 60 and requests the shared storage device 60 to establish and store therein a correspondence between the data and the search target data ID.

To be specific, as shown in FIG. 2C, after reading or retrieving the data from the data controller 10ax, the data collector 30ax transmits the read or retrieved data and the search target data ID used for the search to the shared storage device 60 (see (6) of FIG. 2C). Due to this, as shown in FIG. 5, the shared storage device 60 establishes and stores therein a correspondence between the data and the search target data ID that are received from the data collector 30ax.

Thus, using the salient feature mentioned earlier, the network control system can efficiently carry out the searching process. In other words, the data collectors share in the shared storage device, a search history that is of a result of searches carried out previously. Before accessing the data controllers, the data collectors access and search the shared storage device, thereby enabling to prevent a search overlap. Thus, the searching process can be carried out efficiently.

A structure of the data collector 30ax, which is included in the network control system according to the first embodiment shown in FIGS. 1 to 2C, is explained next with reference to FIG. 6. FIG. 6 is a block diagram of the data collector 30ax.

As shown in FIG. 6, the data collector 30ax includes an input-output control interface 70, a storage unit 80, and a controller 90. The input-output control interface 70 controls a data transfer between the controller 90 and the load-dispersing device 40, the shared storage device 60, and the data controllers 10a1 to 10an.

The storage unit 80 stores therein data and computer programs that are necessary for various processes by the controller 90. Especially, the storage unit 80 includes a reference table storage unit 81 that is closely related to the present invention.

The reference table storage unit 81 stores therein identification data of the data controllers that enables to uniquely identify the data controllers 10a1 to 10an. To be specific, as shown in FIG. 7, the reference table storage unit 81 establishes and stores therein a correspondence between the search target data ID and data controller identification data that is the identification data of the data controller that is controlling the data related to the search target data ID. For example, as shown in FIG. 7, the reference table storage unit 81 establishes and stores therein a correspondence between the search target data ID "A" and data controller identification data "00-E0-00-00-12-01". FIG. 7 is a schematic of an example of data that is stored in a reference table storage unit.

The controller 90 includes an internal memory for storing therein control programs such as an operating system (OS) etc., computer programs that define various process sequences, and necessary data. The controller 90 executes various processes. Especially, the controller 90 includes a search target data ID analyzer 91, a first searching unit 92, and a second searching unit 93 that are closely related to the present invention. The first searching unit 92 corresponds to "shared storage device searching unit" described in claims and the second searching unit 93 similarly corresponds to "data controller searching unit" described in claims.

The search target data ID analyzer 91 determines whether the search target data ID is overlapped. To be specific, upon receiving via the input-output control interface 70 the multiple search target data ID that are transmitted by the load-dispersing device 40, the search target data ID analyzer 91 determines whether the search target data ID are overlapped. If the multiple search target data ID include the same search target data ID, the search target data ID analyzer 91 combines the same search target data ID into a single search target data ID and outputs the multiple search target data ID to the first searching unit 92.

For example, upon simultaneously receiving four search target data ID "A", "B", "B", and "C", the search target data ID analyzer 91 combines the two search target data ID "B" into the single search target data ID "B" and outputs the three search target data ID "A", "B", and "C" to the first searching unit 92.

The first searching unit 92 uses the search target data ID received from the load-dispersing device 40 to search the shared storage device 60. If the data corresponding to the search target data ID is stored in the shared storage device 60, the first searching unit 92 reads the data from the shared storage device 60 and transmits the read data to the load-dispersing device 40.

To be specific, upon receiving the search target data ID from the search target data ID analyzer 91 mentioned earlier, the first searching unit 92 accesses the shared storage device 60 via the input-output control interface 70. Next, the first searching unit 92 uses the search target data ID to search the shared storage device 60. If the same search target data ID is stored in the shared storage device 60, the first searching unit 92 reads or retrieves from the shared storage device 60, data that include predetermined timings from the data corresponding to the search target data ID. Next, the first searching unit 92 transmits to the load-dispersing device 40 via the input-output control interface 70, the data read from the shared storage device 60 and the search target data ID that are used to search the data. The predetermined timing can be, for example, a timing that is instructed by the user using the request terminal such as a timing "12:51:12" that is ten minutes before a timing "13:01:12" when the data collector 30ax has received the search target data. The predetermined timing can also be a timing that is prior set in the data collector 30ax.

For example, upon receiving the search target data ID "A" from the search target data ID analyzer 91, if the search target data ID "A" is stored in the shared storage device 60, the first searching unit 92 reads or retrieves from the shared storage device 60, the data that include timings "13:01", "13:02", and "13:03" from the data corresponding to the search target data ID "A" (see FIG. 5). Next, the first searching unit 92 transmits to the load-dispersing device 40, the data that is read or retrieved from the shared storage device 60 and that includes the timings "13:01", "13:02", and "13:03" and the search target data ID that is used to search the shared storage device 60.

The first searching unit 92 uses the search target data ID received from the search target data ID analyzer 91 to search the shared storage device 60. If the data corresponding to the search target data ID is not stored in the shared storage device

60, the first searching unit 92 outputs the search target data ID to the later explained second searching unit 93, thus transferring the searching process.

If the search target data ID is not stored in the shared storage device 60 when the shared storage device 60 is searched by the first searching unit 92, the second searching unit 93 uses the search target data ID to search the data controller 10ax, reads or retrieves the data corresponding to the search target data ID, and transmits the read or retrieved data to the load-dispersing device 40. Further, the second searching unit 93 transmits the read or retrieved data and the search target data ID corresponding to the read or retrieved data to the shared storage device 60 and requests the shared storage device 60 to establish and store therein a correspondence between the data and the search target data ID.

To be specific, upon receiving the search target data ID from the first searching unit 92, the second searching unit 93 reads or retrieves from the reference table storage unit 81, the identification data of the data controller 10ax corresponding to the search target data ID and accesses the corresponding data controller 10ax via the input-output control interface 70. Next, the second searching unit 93 uses the search target data ID to search the data controller 10ax and reads from the data controller 10ax, the data that includes the predetermined timings from the data corresponding to the search target data ID. Next, the second searching unit 93 transmits to the load-dispersing device 40 via the input-output control interface 70, the data read or retrieved from the data controller 10ax and the search target data ID that is used to search the data controller 10ax. Further, the second searching unit 93 transmits to the shared storage device 60 via the input-output control interface 70, the data read or retrieved from the data controller 10ax and the search target data ID that is used to search the data controller 10ax.

For example, upon receiving the search target data ID "A" from the first searching unit 92, the second searching unit 93 reads or retrieves from the reference table storage unit 81, the data controller identification data "00-E0-00-00-12-01" corresponding to the search target data ID "A" and accesses the corresponding data controller 10ax. Next, the second searching unit 93 searches the data controller 10ax and reads or retrieves the data that include the timings "13:01", "13:02", and "13:03" from the data corresponding to the search target data ID "B". Next, the second searching unit 93 transmits to the load-dispersing device 40, the data that is read or retrieved from the data controller 10ax and that includes the timings "13:01", "13:02", and "13:03" and the search target data ID "B" that is used to search the data controller 10ax. Further, the second searching unit 93 similarly transmits the same data and the search target data ID to the shared storage device 60. The shared storage device 60 establishes and stores therein a correspondence between the data and the search target data ID that are received from the data collector 30ax.

Figure 8:
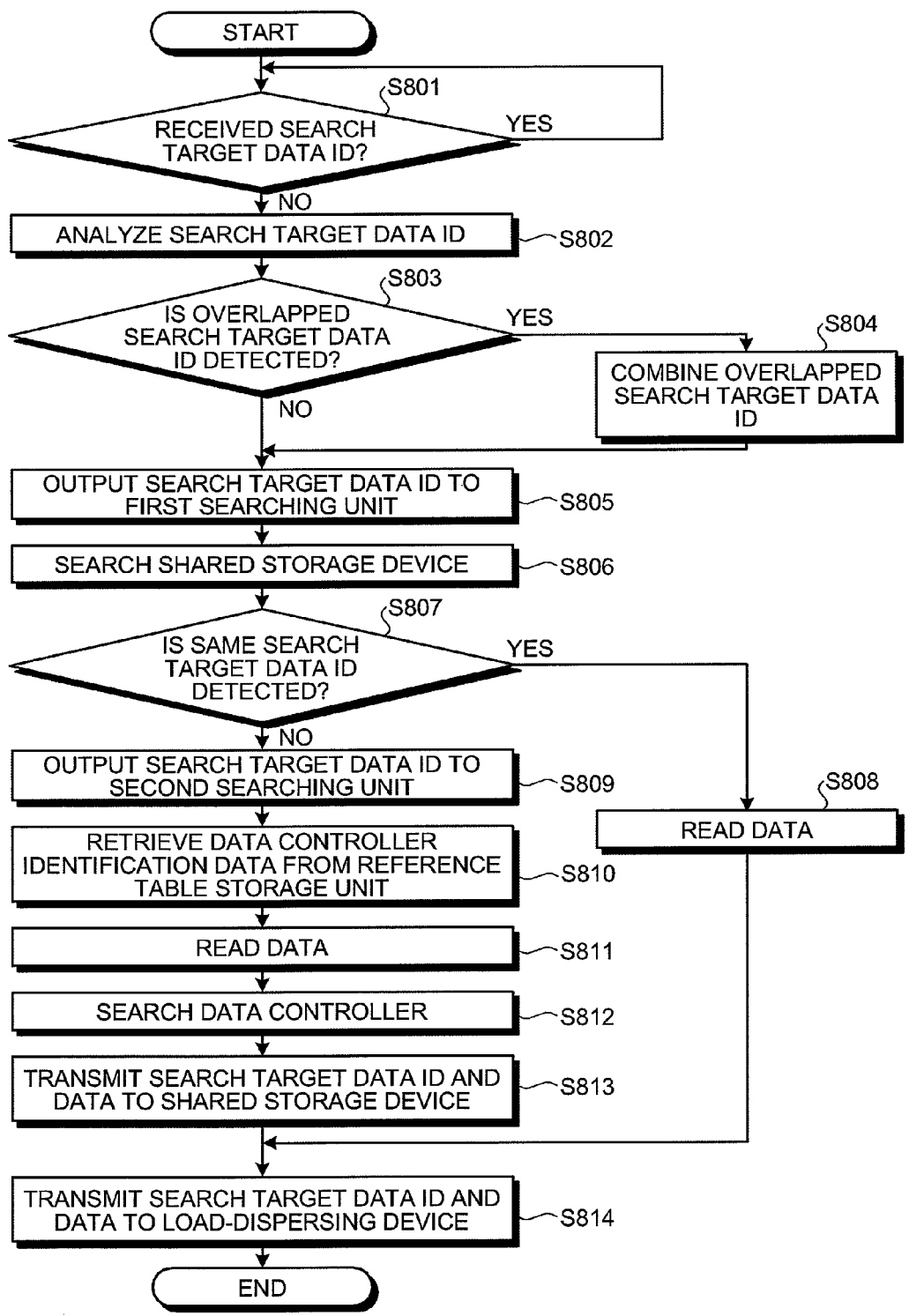
FIG. 8 is a flowchart of a searching process performed by the data collector according to the first embodiment.

Next, a process performed by the data collector in the network control system according to the first embodiment is explained with reference to FIG. 8. FIG. 8 is a flowchart of the searching process performed by the data collector 30ax.

Upon receiving the search target data ID from the input-output control interface 70 (Yes at step S801), the search target data ID analyzer 91 analyzes whether the search target data ID is overlapped (step S802).

If the search target data ID is not overlapped (No at step S803), or after combining the overlapped search target data ID (Yes at step S803 to step S804), the search target data ID analyzer 91 outputs the search target data ID to the first searching unit 92 (step S805).

Next, the first searching unit 92 uses the received search target data ID to search the shared storage device 60 (step S806). If the same search target data ID is detected (Yes at step S807), the first searching unit 92 reads or retrieves the data that includes the predetermined timings (step S808), transmits the search target data ID and the read or retrieved data to the load-dispersing device 40 (step S814), and ends the searching process.

If the same search target data ID is not stored in the shared storage device 60 (No at step S807), the first searching unit 92 outputs the search target data ID to the second searching unit 93 (step S809).

Upon receiving the search target data ID from the first searching unit 92, the second searching unit 93 retrieves from the reference table storage unit 81, the data controller identification data corresponding to the search target data ID (step S810). Based on the data controller identification data, the second searching unit 93 accesses the data controller 10ax and searches the data controller 10ax (step S811).

Next, the second searching unit 93 reads or retrieves from the data controller 10ax, the data that includes the predetermined timings (step S812), transmits the search target data ID and the read or retrieved data to the shared storage device 60 (step S813), transmits the search target data ID and the read or retrieved data to the load-dispersing device 40 (step S814), and ends the searching process. The second searching unit 93 can transmit the search target data ID and the read or retrieved data to the shared storage device 60 and the load-dispersing device 40 in any sequence.

According to the first embodiment, the network control system includes the shared storage device that receives the search target data ID and the data from the data collectors and establishes and stores therein a correspondence between the search target data ID and the data. The data collectors use the search target data ID received from the load-dispersing device to search the shared storage device. If the data corresponding to the search target data ID is stored in the shared storage device, the data collectors read or retrieve the data from the shared storage device and transmit the read or retrieved data to the load-dispersing device. If the data is not stored in the shared storage device at the time of searching the shared storage device, the data collectors use the search target data ID to search the data controllers, read or retrieve the data corresponding to the search target data ID, transmit the read or retrieved data to the load-dispersing device, transmit the read or retrieved data and the search target data ID corresponding to the data to the shared storage device, and request the shared storage device to establish and store therein a correspondence between the data and the search target data ID. Due to this, the searching process can be carried out efficiently. In other words, the data collectors share in the shared storage device, the search history that is of the result of searches carried out previously. Before accessing the data controllers, the data collectors access and search the shared storage device, thereby enabling to prevent a search overlap and enabling to efficiently carry out the searching process.

Using the search target data ID, upon receiving the search target data ID from the load-dispersing device, to search the data controller is explained in the first embodiment. The data collector explained in the second embodiment uses a predetermined search target data ID that is a representative search target data ID for the multiple data collectors and periodically uses the search target data ID to search the data collectors.

Figure 9A:
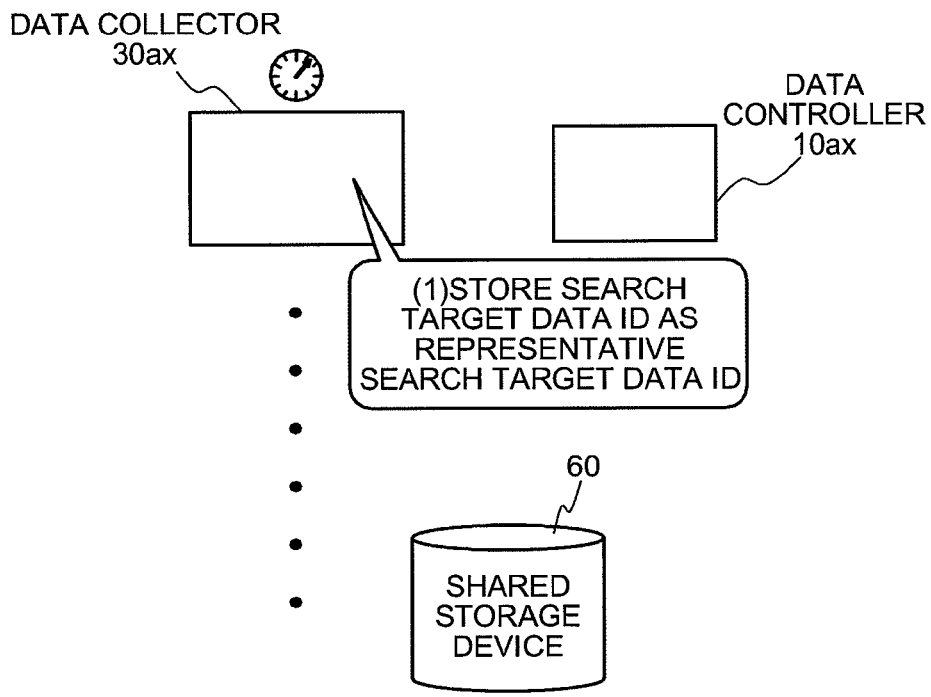
FIGS. 9A and 9B are schematics for explaining an overview and a salient feature of a network control system according to a second embodiment of the present invention.
Figure 9B:
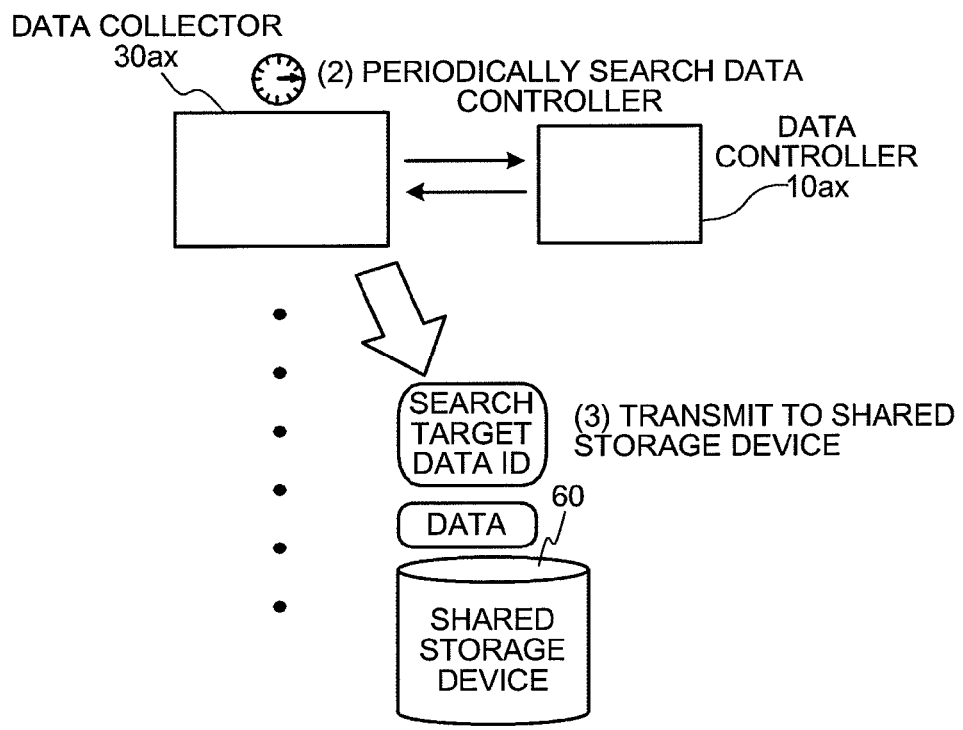

The overview of the data collector according to the second embodiment is explained with reference to FIGS. 9A and 9B. FIGS. 9A and 9B are schematics for explaining the overview of the data collector according to the second embodiment.

As shown in FIG. 9A, if the search target data ID which is received by the data collector 30ax from the load-dispersing device 40 is not stored in the shared storage device 60 and the data collector 30ax uses the search target data ID to search the data controller 10ax, the data collector 30ax stores therein the search target data ID for periodically searching the data controller 10ax as the representative search target data ID for the data collectors 30a1 to 30ak (see (1) of FIG. 9A).

As shown in FIG. 9B, at the periodic timing after lapse of a time period, the data collector 30ax accesses the data controller 10ax, and searches the data controller 10ax by using the search target data ID as the representative search target data ID for searching the data controller 10ax (see (2) of FIG. 9B). Next, the data collector 30ax reads or retrieves from the data controller 10ax, the data that includes the predetermined timings and transmits the read or retrieved data and the corresponding search target data ID to the shared storage device 60 (see (3) of FIG. 9B). Due to this, regardless of whether the search target data ID is transmitted from the load-dispersing device 40 to the data collector 30ax, the latest data in the shared storage device 60 is periodically updated and the shared storage device 60 stores therein the updated data.

Figures 10, 11:
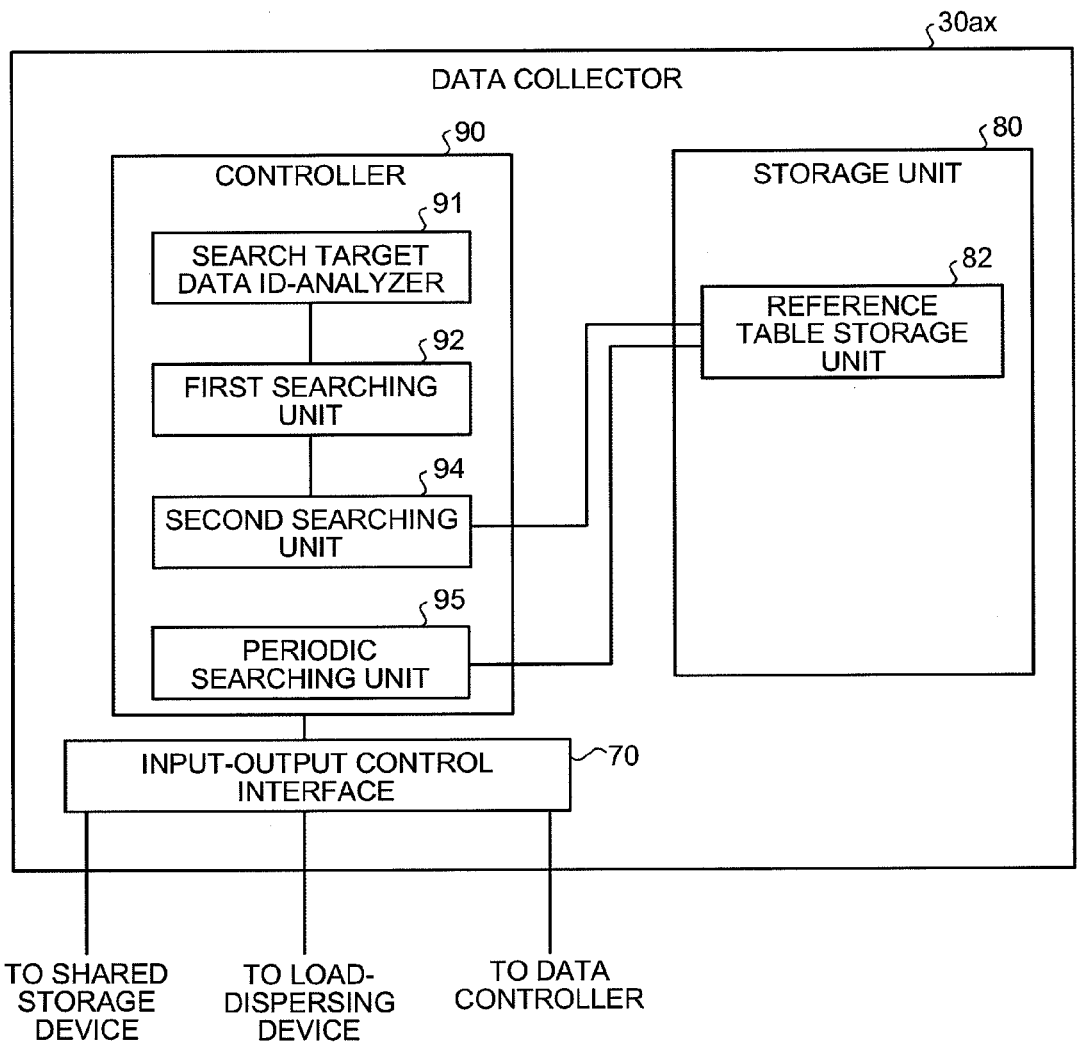
FIG. 10 is a block diagram of a data collector according to the second embodiment.
FIG. 11 is a schematic of an example of data that is stored in the reference table storage unit.

The structure of the data collector 30ax according to the second embodiment is explained next with reference to FIG. 10. FIG. 10 is a block diagram of the data collector 30ax.

As shown in FIG. 10, similarly as the first embodiment, the data collector 30ax includes the input-output control interface 70, the storage unit 80, and the controller 90. Further, the storage unit 80 includes a reference table storage unit 82 and the controller 90 includes the search target data ID analyzer 91, the first searching unit 92, a second searching unit 94, and a periodic searching unit 95. Components, which carry out the same operations as the respective operations in the first embodiment, are referred using the same reference numerals and an explanation is omitted. Thus, only the reference table storage unit 82, the second searching unit 94, and the periodic searching unit 95 are explained below.

The reference table storage unit 82 stores therein the search target data ID that is used as the representative search target data ID by the second searching unit 94 to search the data controller 10ax. To be specific, the reference table storage unit 82 establishes a correspondence between the search target data ID and the identification data of the data controller and further establishes and stores therein a correspondence with data (a status that indicates whether a representation flag is on or off) that indicates whether to use the search target data ID as the representative search target data ID for the data collectors 30a1 to 30ak and search the data controller 10ax. For example, as shown in FIG. 11, the reference table storage unit 82 establishes and stores therein a correspondence among the search target data ID "A", the data controller identification data "00-E0-00-00-12-01", and an off status of the representation flag. Similarly, the reference table storage unit 82 establishes and stores therein a correspondence among the search target data ID "B", the data controller identification data "00-E0-00-00-12-01", and an on status of the representation flag. FIG. 11 is a schematic of an example of data that is stored in the reference table storage unit.

Similarly as the first embodiment, if the search target data ID is not stored in the shared storage device 60 at the time of searching by the first searching unit 92, the second searching unit 94 uses the search target data ID received from the first searching unit 92 to search the data controller 10ax. Further, in the second embodiment, upon receiving the search target data ID from the first searching unit 92, the second searching unit 94 reads or retrieves from the reference table storage unit 82, the identification data of the data controller corresponding to the search target data ID and turns on the representation flag. For example, as shown in FIG. 11, upon receiving the search target data ID "B" from the first searching unit 92, the second searching unit 94 reads or retrieves the data controller identification data "00-E0-00-00-12-01" and turns on the representation flag corresponding to the search target data ID "B".

The periodic searching unit 95 uses the search target data ID that is stored by the reference table storage unit 82 to periodically search the data controller 10ax and reads or retrieves the data corresponding to the search target data ID. Next, the periodic searching unit 95 transmits the read or retrieved data and the search target data ID corresponding to the read or retrieved data to the shared storage device 60 and requests the shared storage device 60 to establish and store therein a correspondence between the data and the search target data ID.

To be specific, at the periodic timing (for example, for every minute etc.) the periodic searching unit 95 reads or retrieves from the reference table storage unit 82, the search target data ID for which the representation flag is turned on and the identification data of the data controller, accesses the data controller 10ax corresponding to the identification data, and uses the search target data ID to search the data controller 10ax. Next, upon reading or retrieving the data that includes the predetermined timings from the data corresponding to the search target data ID, the periodic searching unit 95 transmits the read or retrieved data and the search target data ID to the shared storage device 60.

A process performed by the data collector 30ax according to the second embodiment is explained next with reference to FIG. 12. FIG. 12 is a flowchart of a periodic searching process performed by the data collector 30ax.

At the periodic timing (Yes at step S1201) the periodic searching unit 95 retrieves from the reference table storage unit 82, the search target data ID for which the representation flag is turned on and the identification data of the data controller (step S1202).

Next, the periodic searching unit 95 accesses the data controller 10ax corresponding to the identification data and uses the search target data ID to search the data controller 10ax (step S1203). The periodic searching unit 95 reads or retrieves the data that includes the predetermined timings from the data corresponding to the search target data ID (step S1204). Next, the periodic searching unit 95 transmits to the shared storage device 60, the data read or retrieved from the data controller 10ax and the search target data ID used for searching the data controller 10ax (step S1205) and ends the periodic searching process.

According to the second embodiment, the data collectors store therein the search target data ID that is used to search the data controllers as the representative search target data ID. The data collectors use the stored search target data ID to periodically search the data controllers, read or retrieve the data corresponding to the search target data ID, transmit to the shared storage device, the read or retrieved data and the search target data ID corresponding to the data, and request the shared storage device to establish and store therein a correspondence between the data and the search target data ID. Due to this, the searching process can be carried out further efficiently. In other words, when the latest data is successively added to the data controllers, the data collectors use the predetermined search target data ID as the representative search target data ID, periodically prior retrieve the data, and share the search history in the shared storage device. Before accessing the data controllers, the data collectors access the shared storage device, thereby enabling to prevent a search overlap and enabling to carry out the searching process further efficiently.

The representation flag is put up (turn on) or put down (turn off). Putting up the representation flag is explained in the second embodiment. Putting down the put up representation flag upon satisfaction of predetermined conditions is explained in the third embodiment.

Figure 13A:
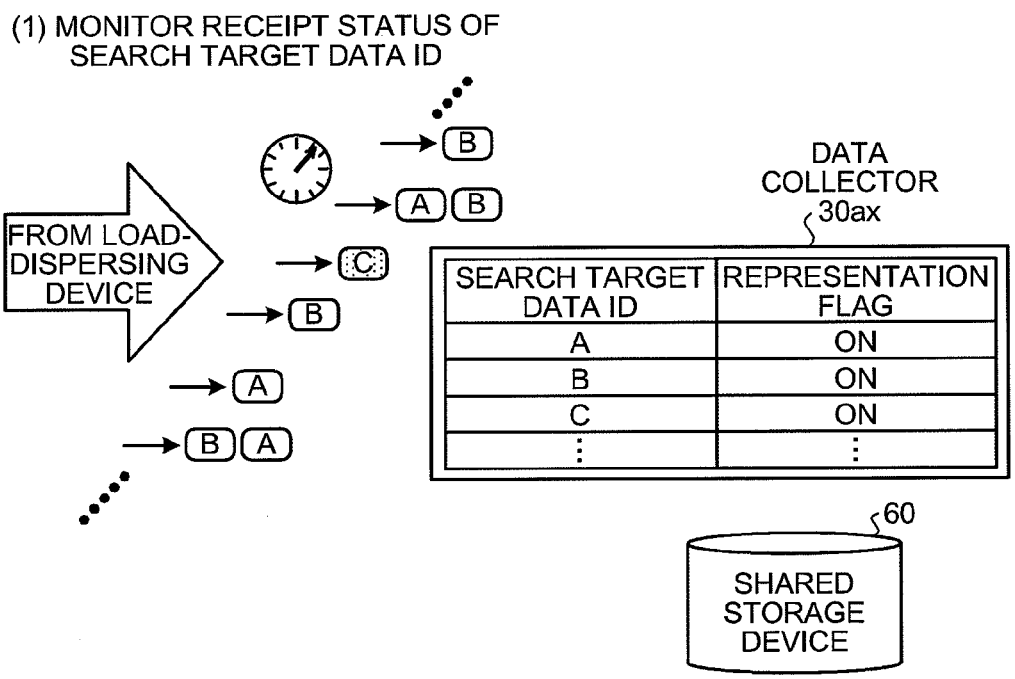
FIGS. 13A and 13B are schematics for explaining an overview and a salient feature of a network control system according to a third embodiment of the present invention.
Figure 13B:
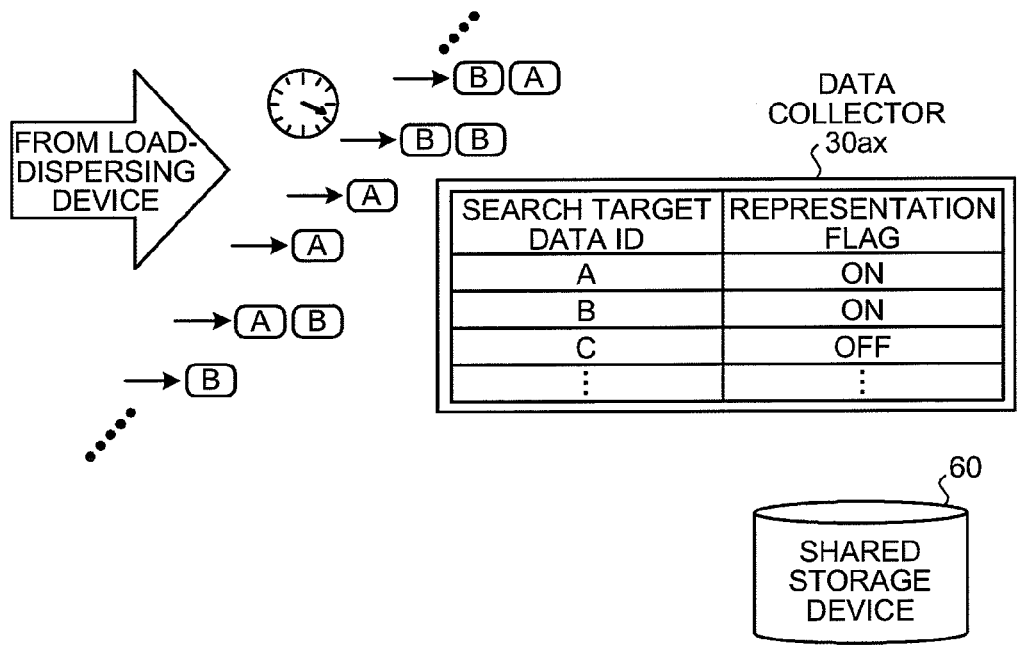

The overview of the data collector according to the third embodiment is explained with reference to FIGS. 13A and 13B. FIGS. 13A and 13B are schematics for explaining the overview of the data collector according to the third embodiment. The overview of the data collector is explained on the assumption that the representation flags of the search target data ID "A", "B", and "C" are turned on.

As shown in FIG. 13A, among the search target data ID that are transmitted from the load-dispersing device 40, the data collector 30ax monitors a receipt status of the search target data ID for which the representation flag is turned on (see (1) of FIG. 13A). As shown in FIG. 13B, if the search target data ID "C" is not received even after lapse of a predetermined time period when the search target data ID is last received, the data collector 30ax turns off the representation flag corresponding to the search target data ID "C" (see FIG. 13B). Further, the data collector 30ax accesses the shared storage device 60 and instructs the shared storage device 60 to delete the search target data ID "C" and the data corresponding to the search target data ID "C" (see FIGS. 13A and 13B). Due to this, the shared storage device 60 deletes the search target data ID that is infrequently transmitted from the load-dispersing device 40 and stores therein the search target data ID that are frequently transmitted from the load-dispersing device 40.

Figure 14:
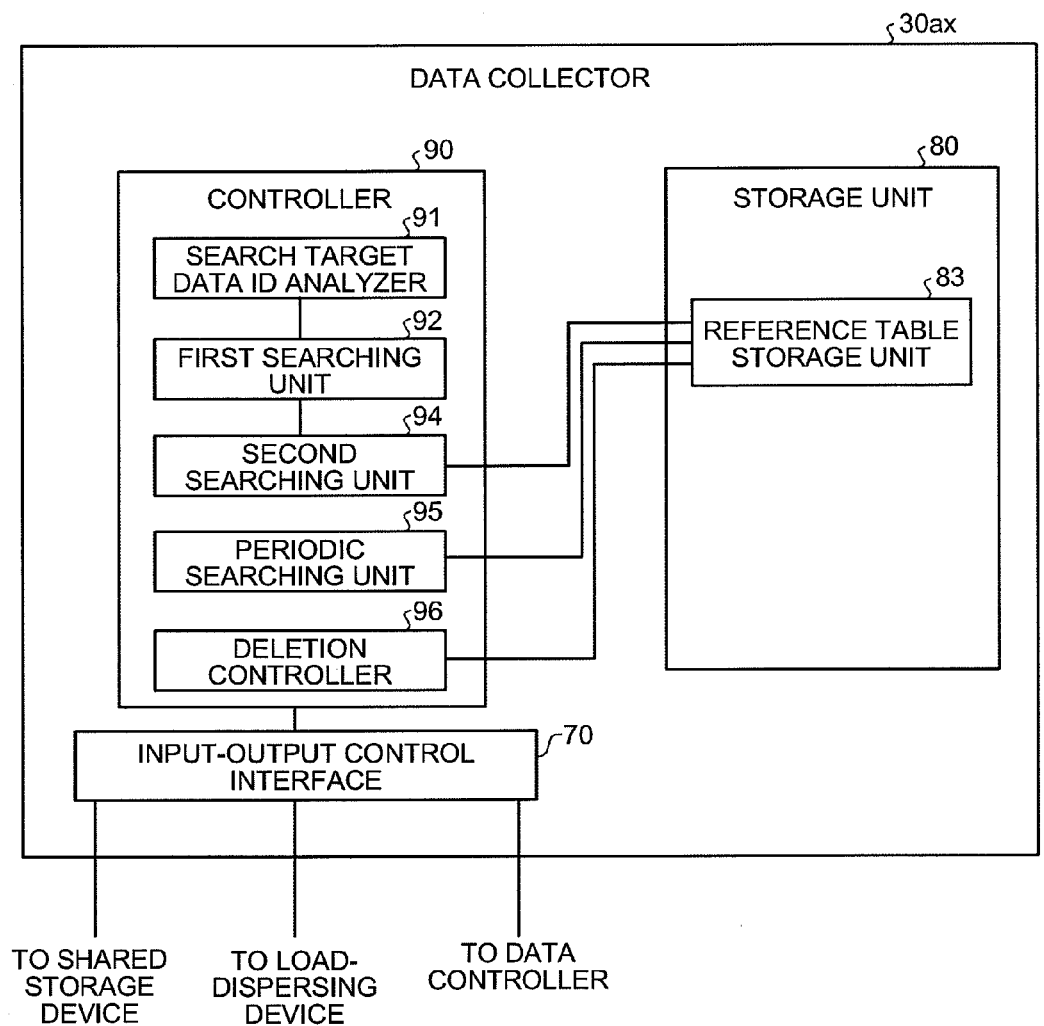
FIG. 14 is a block diagram of a data collector according to the third embodiment.

The structure of the data collector 30ax according to the third embodiment is explained next with reference to FIG. 14. FIG. 14 is a block diagram of the data collector 30ax.

As shown in FIG. 14, similarly as the second embodiment, the data collector 30ax includes the input-output control interface 70, the storage unit 80, and the controller 90. Further, the storage unit 80 includes a reference table storage unit 83 and the controller 90 includes the search target data ID analyzer 91, the first searching unit 92, the second searching unit 94, the periodic searching unit 95, and a deletion controller 96. Components, which carry out the same operations as the respective operations in the second embodiment, are referred using the same reference numerals and an explanation is omitted. Thus, only the reference table storage unit 83 and the deletion controller 96 are explained below.

The reference table storage unit 83 stores therein data for enabling the periodic searching unit 95 to determine a necessity of the search target data ID. To be specific, as shown in FIG. 15, the reference table storage unit 83 establishes and stores therein a correspondence among the search target data ID, the data controller identification data, the status (on or off) of the representation flag, and a latest receipt timing that indicates the latest timing when the data collector 30ax has received the search target data ID. For example, as shown in FIG. 15, the reference table storage unit 83 establishes and stores therein a correspondence among the search target data ID "B", the data controller identification data "00-E0-00-00-12-01", the on status of the representation flag, and the latest receipt timing "12:38". The reference table storage unit 83 can also store therein a receipt timing of the search target data ID for which the representation flag is turned off.

From among the search target data ID that are stored by the reference table storage unit 83, the deletion controller 96 monitors the receipt status of the search target data ID from the load-dispersing device 40 for the search target data ID for which the representation flag is turned on. Thus, the deletion controller 96 determines the necessity of a periodic search using the search target data ID. The deletion controller 96 deletes from the reference table storage unit 83 the search target data ID that is determined as unnecessary. Further, the deletion controller 96 requests the shared storage device 60 to delete the search target data ID that is determined as unnecessary and the data corresponding to the search target data ID.

To be specific, among the search target data ID that are received from the load-dispersing device 40, if the representation flag of the received search target data ID in the reference table storage unit 83 is turned on, the deletion controller 96 updates the latest receipt timing of the search target data ID. Further, the deletion controller 96 refers to the reference table storage unit 83 using the predetermined timing and determines, based on whether the latest receipt timing is updated within the predetermined time period, the necessity of the search target data ID. If the latest receipt timing is not updated even after lapse of the predetermined time period, the deletion controller 96 determines that the periodic searching unit 95 does not need to search the data controller 10ax using the search target data ID corresponding to the latest receipt timing and turns off the representation flag of the search target data ID. Further, the deletion controller 96 reads the search target data ID for which the representation flag is turned off, accesses the shared storage device 60, and deletes the corresponding search target data ID and the data from the shared storage device 60.

Figure 16:
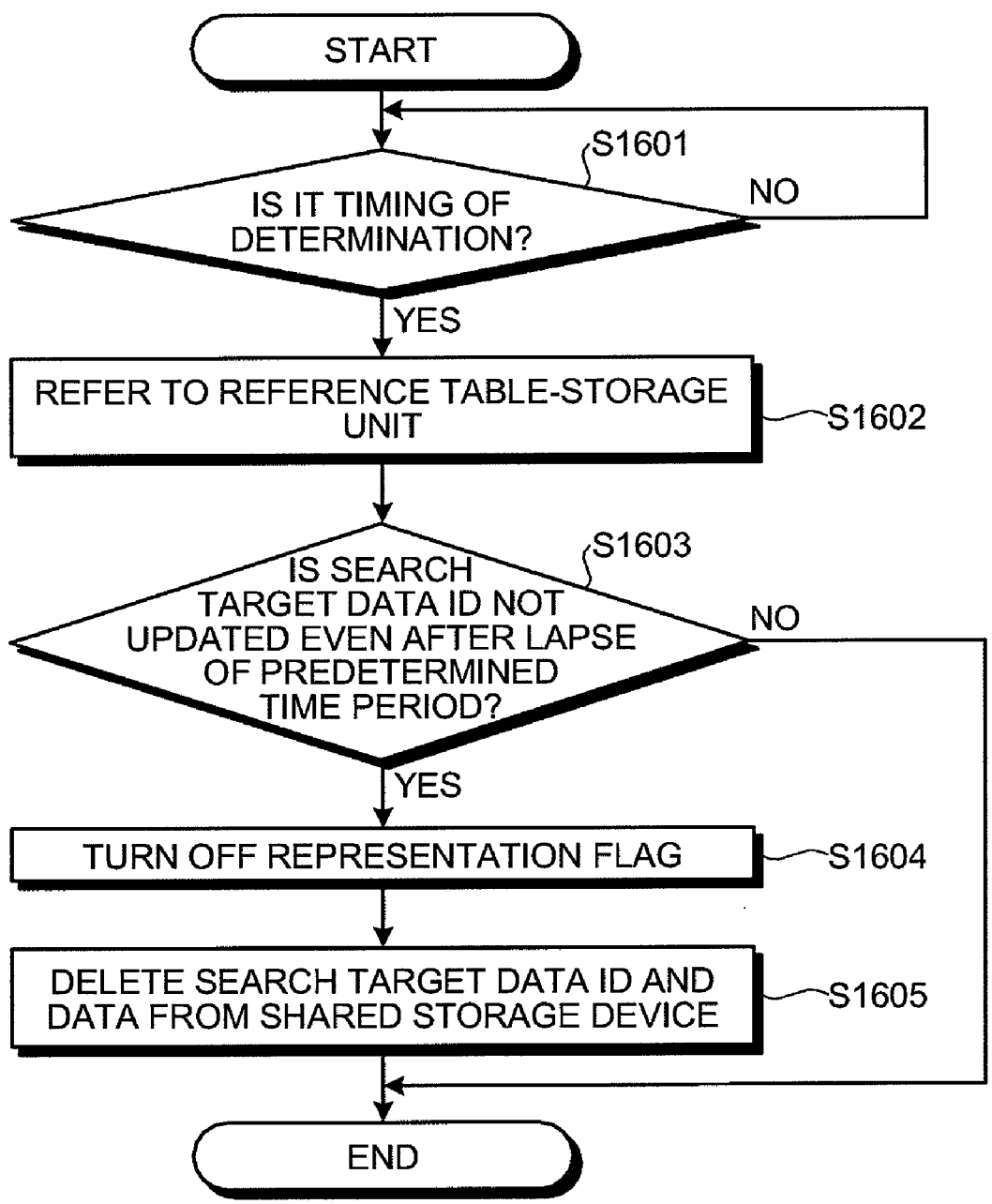
FIG. 16 is a flowchart of a deletion process performed by the data collector according to the third embodiment.

Next, a process performed by the data collector 30ax according to the third embodiment is explained with reference to FIG. 16. FIG. 16 is a flowchart of a deletion process performed by the data collector 30ax.

At the timing to determine the necessity of the search target data ID (Yes at step S1601), the deletion controller 96 refers to the reference table storage unit 83 (step S1602) and determines whether the latest receipt timing is updated within the predetermined time period (step S1603).

If the latest receipt timing of the search target data ID is not updated even after lapse of the predetermined time period (Yes at step S1603), the deletion controller 96 turns off the representation flag corresponding to the search target data ID (step S1604). Next, the deletion controller 96 reads from the reference table storage unit 83, the search target data ID corresponding to the representation flag that is turned off, accesses the shared storage device 60, and instructs the shared storage device 60 to delete the corresponding search target data ID and the data from the shared storage device 60 (step S1605).

According to the third embodiment, the data collectors monitor the receipt status of the search target data ID from the load-dispersing device for the search target data ID that is stored as the representative search target data ID. The data collectors determine the necessity of the periodic search using the search target data ID. If the search target data ID is determined as unnecessary, the data collectors delete the search target data ID and request the shared storage device to delete the search target data ID and the corresponding data. Due to this, a time period required for the searching process when the data collectors search the shared storage device can be reduced. In other words, preventing an increase of data that is stored in the shared storage device enables to reduce the time period required for the searching process when the data collectors search the shared storage device.

An addition of a data collector or a removal of the existing data collector in the network control system, which uses the data collector according to the third embodiment, is explained in the fourth embodiment.

Figure 17A:
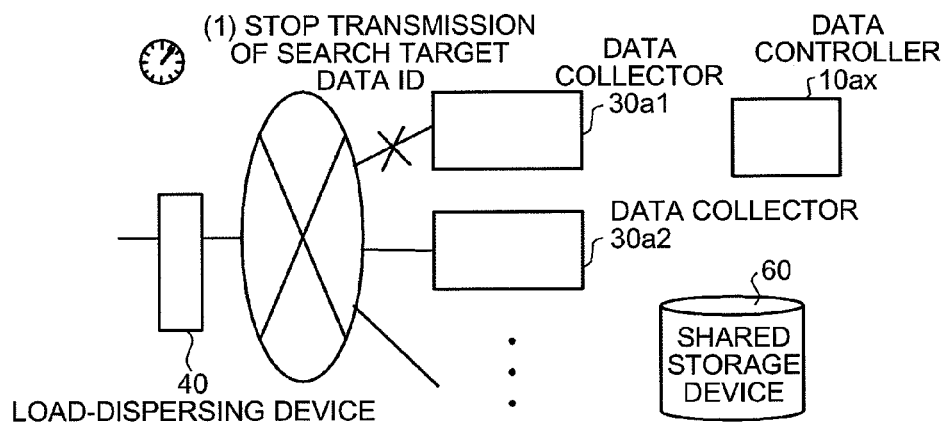
FIGS. 17A to 17C are schematics for explaining an overview of a network control system according to a fourth embodiment of the present invention.
Figure 17B:
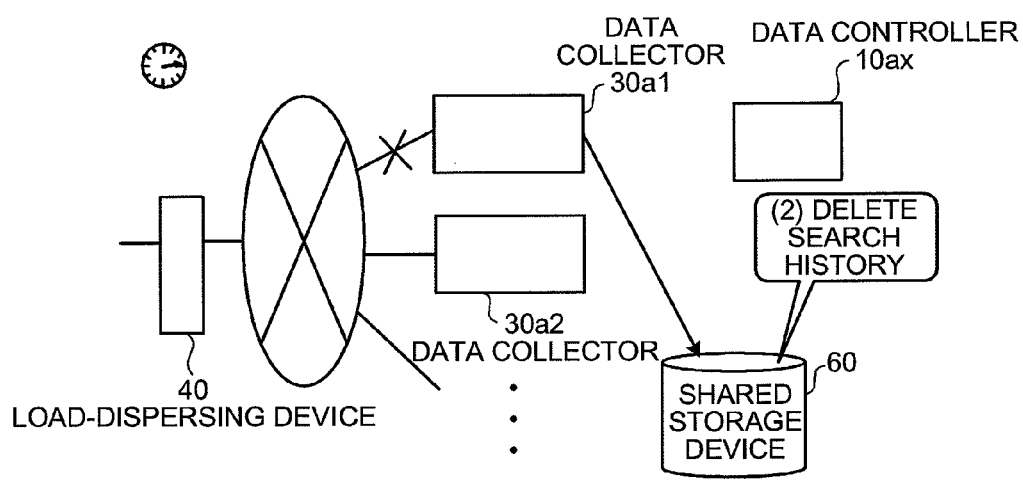
Figure 17C:
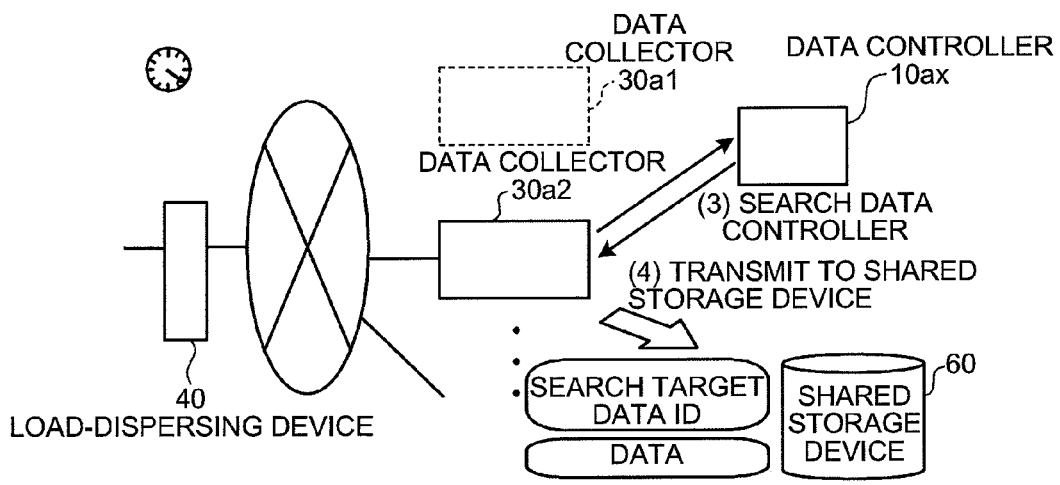

The overview of the network control system according to the fourth embodiment is explained with reference to FIGS. 17A to 17C. FIGS. 17A to 17C are schematics for explaining the overview of the network control system according to the fourth embodiment.

As shown in FIG. 17A, the load-dispersing device 40 stops transmission of the search target data ID to the data collector 30a1 that is to be removed (see (1) of FIG. 17A).

Next, as shown in FIG. 17B, upon lapse of a time period, the data collector 30a1 deletes, using the deletion process explained in the third embodiment, the search history that is left by the data collector 30a1 itself from the search history that is stored by the shared storage device 60 (see (2) of FIG. 17B). Upon deleting the search history, the data collector 30a1 can be removed from the network control system.

Upon further lapse of a time period, the data collector 30a2 (or any other data collector) receives the search target data ID that is previously treated as the representative search target data ID and that is continuously updated by the data collector 30a1. The data collector 30a2 searches the shared storage device 60 using the search target data ID. Next, as shown in FIG. 17C, because the search target data ID is not stored in the shared storage device 60 (see (2) of FIG. 17B), the data collector 30a2 transmits to the shared storage device 60, the data that is read or retrieved by searching the data controller 10ax and the search target data ID that is used to search the data controller 10ax (see (3) and (4) of FIG. 17C). Due to this, the process, which is carried out by the data collector 30a1 as a representative data collector, is transferred to the data collector 30a2.

When adding the data collector 30a1, the data collector 30a1 is connected to the network control system via the network such that the data collector 30a1 and the network control system are mutually communicable and the load-dispersing device 40 can start transmission of the search target data ID to the data collector 30a1.

Figure 18:
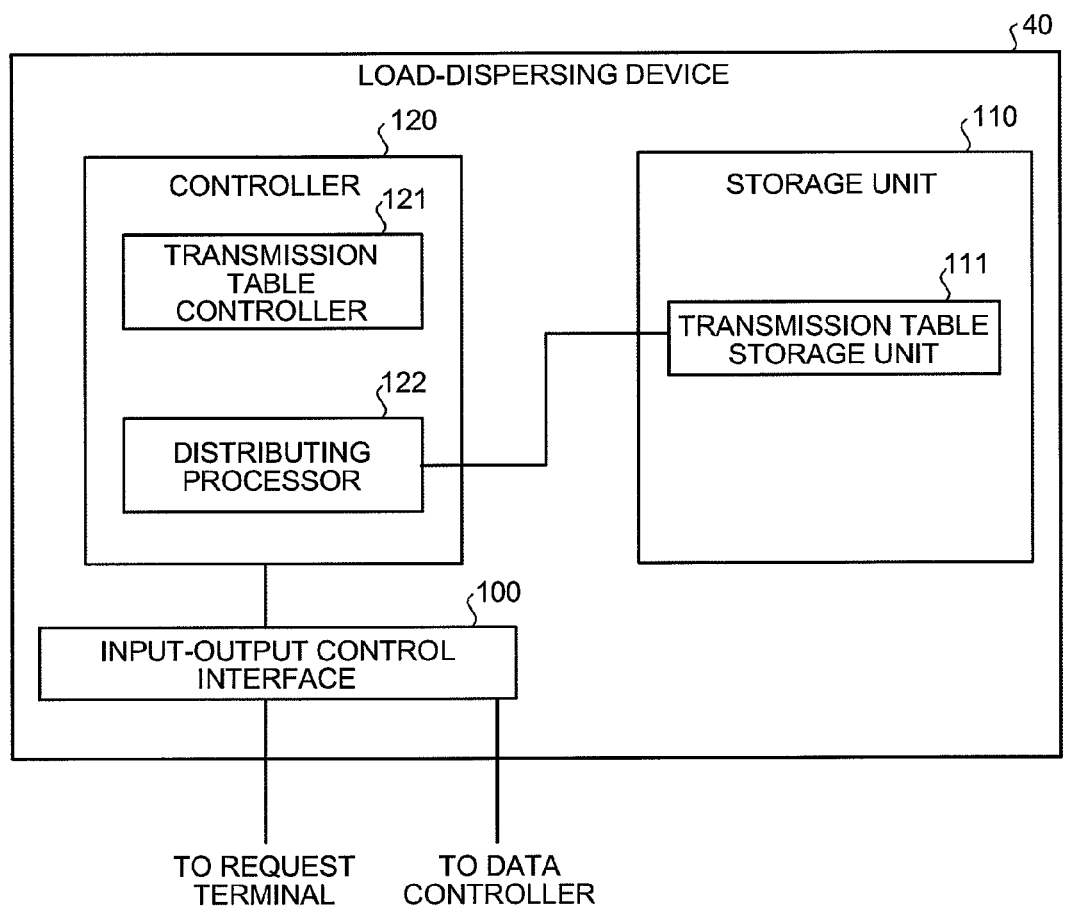
FIG. 18 is a block diagram of a load-dispersing device according to the fourth embodiment.

Next, the structure of the load-dispersing device 40 in the network control system according to the fourth embodiment is explained with reference to FIG. 18. FIG. 18 is a block diagram of the load-dispersing device 40.

As shown in FIG. 18, the load-dispersing device 40 includes an input-output control interface 100, a storage unit 110, and a controller 120. The input-output control interface 100 controls data transfer between the controller 120, and the request terminals 20a1 to 20am and the data collectors 30a1 to 30ak.

The storage unit 110 stores therein data and computer programs that are necessary for various processes by the controller 120. Especially, the storage unit 110 includes a transmission table storage unit 111 that is closely related to the present invention. The transmission table storage unit 111 corresponds to "device identification data storage unit" described in claims.

The transmission table storage unit 111 stores therein identification data of the data collectors that uniquely identifies the data collectors 30a1 to 30ak that are current targets for transmission of the search target data ID. To be specific, as shown in FIGS. 19A to 19C, the transmission table storage unit 111 stores therein data collector identification data that is the identification data of the data collectors that are the current targets for transmission of the search target data ID. For example, as shown in FIG. 19A, the transmission table storage unit 111 stores therein data controller identification data "00-G0-00-00-13-01" to "00-G0-00-00-13-05".

The controller 120 includes an internal memory for storing therein control programs such as OS etc., computer programs that define various process sequences, and necessary data. The controller 120 executes various processes. Especially, the controller 120 includes a transmission table controller 121 and a distributing processor 122. The transmission table controller 121 corresponds to "device identification data controller" that is described in claims and the distributing processor 122 corresponds to "distributing unit" that is described in claims.

The transmission table controller 121 adds the identification data of the data collector to the transmission table storage unit 111 or deletes the identification data of the data collector from the transmission table storage unit 111. To be specific, upon receiving a request to add the data collector, the transmission table controller 121 establishes a correspondence between a unique identification data and the data collector, and records the identification data in the transmission table storage unit 111. For example, as shown in FIG. 19A, if five data collector identification data are previously recorded in the transmission table storage unit 111, the transmission table controller 121 establishes a correspondence between the added data collector and identification data "00-G0-00-00-13-06". Next, as shown in FIG. 19B, the transmission table controller 121 records the data collector identification data "00-G0-00-00-13-06" in the transmission table storage unit 111.

Further, upon receiving a request to delete the data collector, the transmission table controller 121 deletes the corresponding identification data from the transmission table storage unit 111. For example, as shown in FIG. 19A, if five data collector identification data are previously recorded in the transmission table storage unit 111, the transmission table controller 121 deletes, as shown in FIG. 19C, the identification data "00-G0-00-00-13-03" of the data collector from the transmission table storage unit 111.

According to the identification data of the data collectors that is stored by the transmission table storage unit 111, the distributing processor 122 distributes the search target data ID to the data collectors. To be specific, upon receiving the search target data ID from the request terminals 20a1 to 20am via the network, the distributing processor 122 equally (or by carrying out a predetermined weighing) distributes the search target data ID to the data collectors while referring to the transmission table storage unit 111.

According to the fourth embodiment, the load-dispersing device stores therein the identification data that uniquely identifies the data collectors that are the current targets for transmission of the search target data ID. The load-dispersing device distributes the search target data ID to the data collectors by adding or deleting the identification data. Due to this, a data collector can be removed from the network control system or a data controller can be newly embedded into the network control system without causing an erroneous operation.

The embodiments of the present invention are explained. However, various modifications may be made other than the specific details and representative embodiments shown and described herein. Other embodiments are explained separately below.

The shared storage device, which stores therein data, is explained in the first embodiment. However, the present invention is not to be thus limited, and the data can also be stored in a storage location that is separate from the shared storage device. Data such as a uniform resource locator (URL), which indicates a location of the data, can be stored in the shared storage device.

Figure 20:
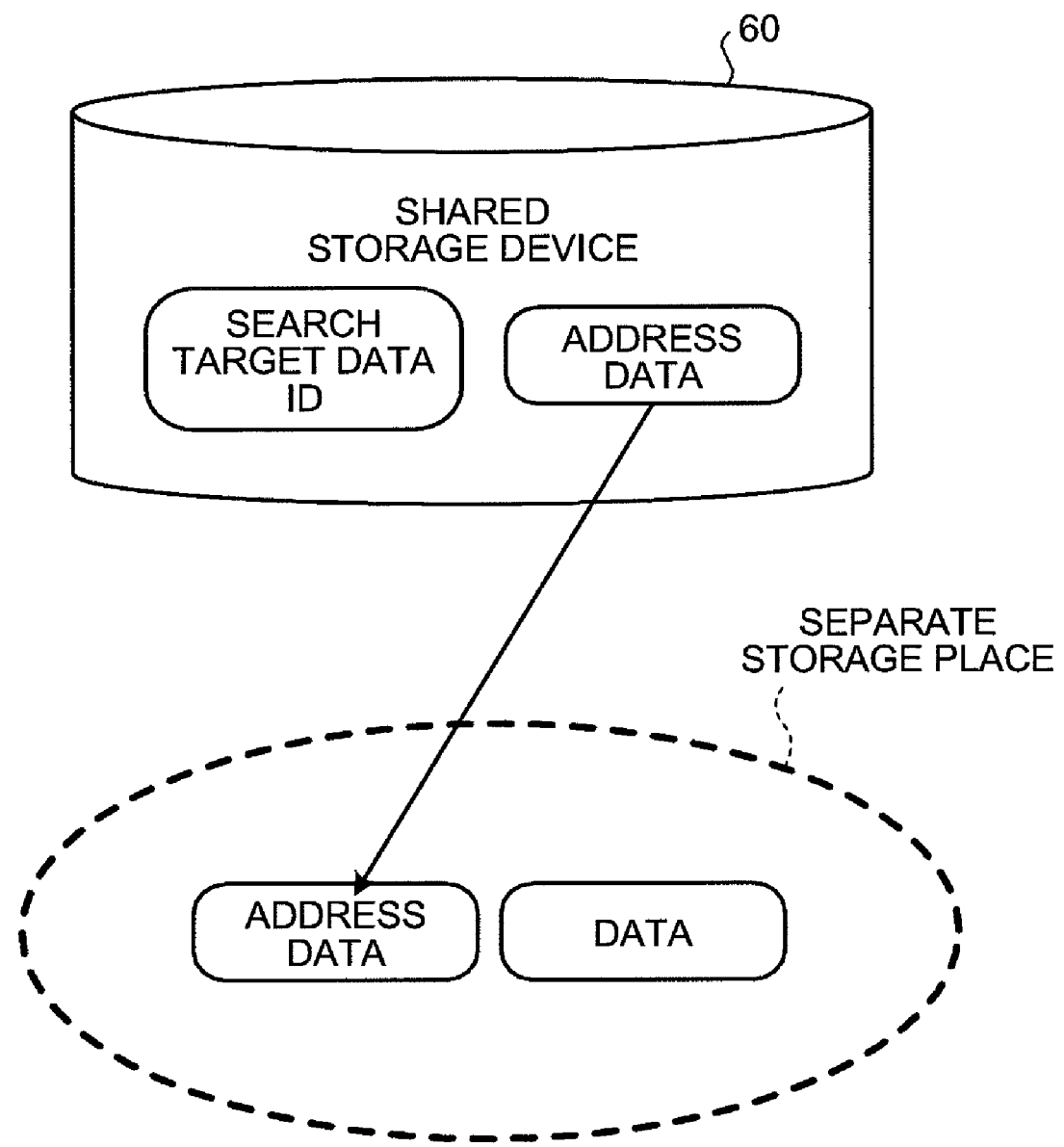
FIG. 20 is a schematic for explaining a modification of the first embodiment.

To be specific, the second searching unit 93 stores the read or retrieved data in the storage location that differs from the shared storage device 60. Next, the second searching unit 93 transmits to the shared storage device 60, the search target data ID corresponding to the read or retrieved data and address data that indicates the storage location and requests the shared storage device 60 to establish and store therein a correspondence between the search target data ID and the address data. Due to this, as shown in FIG. 20, the shared storage device 60 establishes and stores therein a correspondence between the search target data ID and the address data. Further, in the separate storage location, a predetermined storage device establishes and stores therein a correspondence between the address data and the data. FIG. 20 is schematic for explaining a modification of the first embodiment.

The first searching unit 92 uses the search target data ID received from the load-dispersing device 40 to search the shared storage device 60. If the address data corresponding to the search target data ID is stored in the shared storage device 60, the first searching unit 92 reads or retrieves the data from the storage location indicated by the address data and transmits the read or retrieved data to the load-dispersing device 40.

If the address data is not stored in the shared storage device 60 at the time of searching by the first searching unit 92, the second searching unit 93 uses the search target data ID to search the data controllers 10a1 to 10an, reads or retrieves the data corresponding to the search target data ID, and transmits the read or retrieved data to the load-dispersing device 40. Due to this, a pressure on a resource of the shared storage device 60 can be prevented.

The network control system, which transacts the data that is generated by the switches for each fixed time period, is explained in the first embodiment. However, the present invention is not to be thus limited, and the network control system can transact any data such as data that includes a company name, a share price, and a timing when the share price is retrieved, or data that includes a program name, a viewer rating, and a timing when the viewer rating is retrieved etc.

The data collector, which reads or retrieves the data that includes the predetermined timings when reading the data from the shared storage device or the data controller, is explained in the first embodiment mentioned earlier. However, the present invention is not to be thus limited, and the data collector can also read or retrieve all the data corresponding to the search target data ID that is used for the search without using timing data.

In the third embodiment explained earlier, based on whether the latest receipt timing is updated within the predetermined time period, the data collector determines the necessity of the search target data ID as the representative search target data ID. However, the present invention is not to be thus limited, and the data controller can use any method that determines the necessity of the search target data ID using the receipt status of the search target data ID. For example, the data controller can also determine the necessity of the search target data ID based on whether a receipt count within a predetermined period is less than a predetermined count.

The constituent elements of the device illustrated are merely conceptual and may not necessarily physically resemble the structures shown in the drawings. For instance, the device need not necessarily have the structure that is illustrated. The device as a whole or in parts can be broken down or integrated either functionally or physically in accordance with the load or how the device is to be used. For example, the second searching unit 93 can be broken down into a data controller searching unit that uses the search target data ID to search the data controllers and a transmitter that transmits the search target data ID and the data to the shared storage device. Further, the process functions performed by the apparatus are entirely or partially realized by a central processing unit (CPU) or a program executed by the CPU or by a hardware using wired logic.

The sequence of processes, the sequence of controls, specific names, and data including various parameters can be changed as required unless otherwise specified. For example, the reference symbols "A" and "B" which are used to indicate the search target data ID are not to be thus limited, and any reference symbols that uniquely identify the data can be used.

Figure 21:
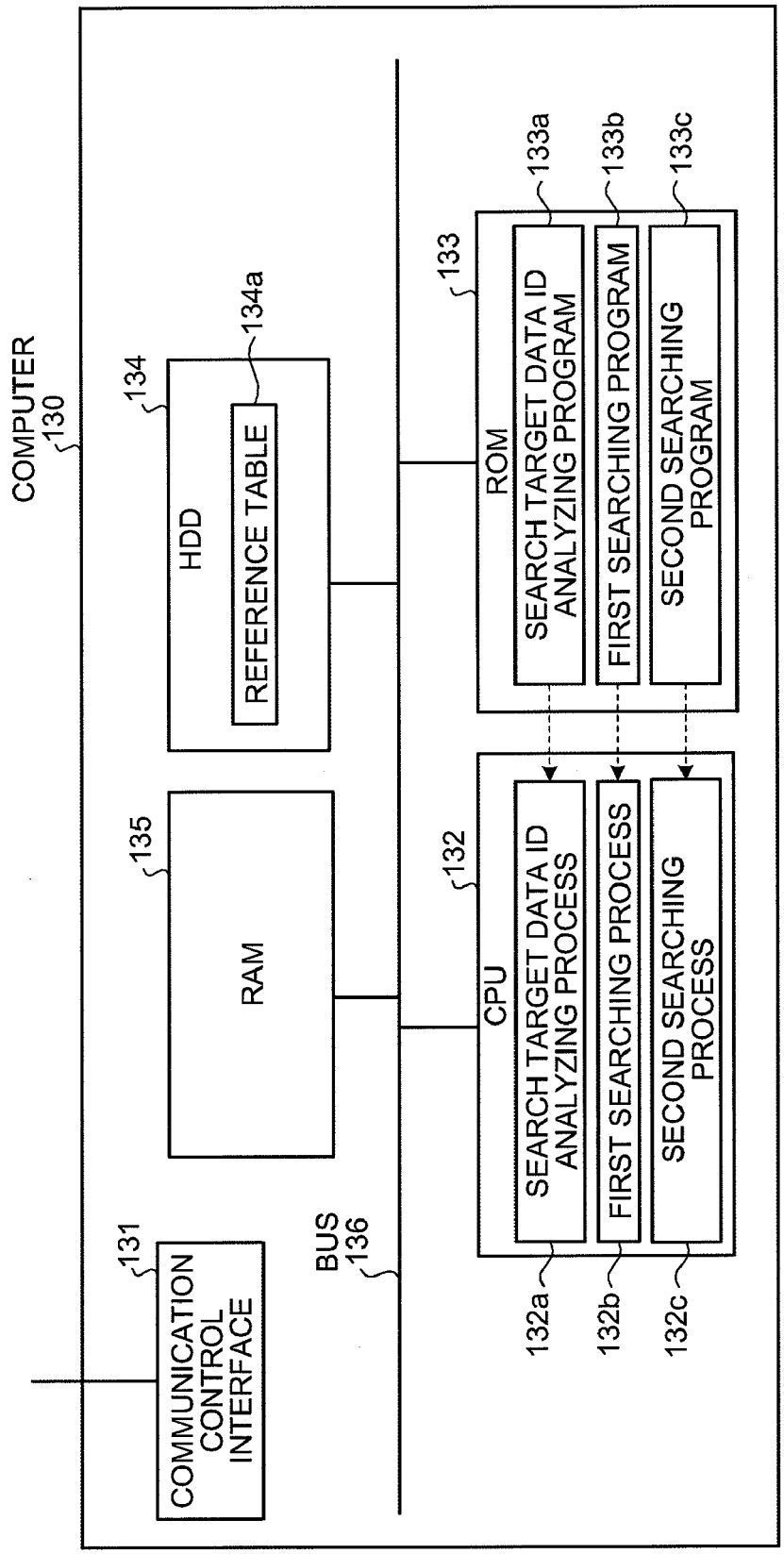
FIG. 21 is a block diagram of a computer that executes a data-collecting program.

Realizing various processes using hardware logic is explained in the first embodiment mentioned earlier. However, the present invention is not to be thus limited, and the processes can also be realized by executing a prior formulated computer program using a computer. An example of the computer, which executes a data-collecting program that includes functions similar to the data collector 30ax according to the first embodiment, is explained next with reference to FIG. 21. FIG. 21 is a block diagram of the computer that executes the data-collecting program.

As shown in FIG. 21, a computer 130, which executes the functions of the data collector 30ax, includes a communication control interface 131, a CPU 132, a read only memory (ROM) 133, a hard disk drive (HDD) 134, and a random access memory (RAM) 135 that are connected by a bus 136.

The ROM 133 prior stores therein the data-collecting program that exhibits functions similar to the data collector 30ax explained in the first embodiment. In other words, as shown in FIG. 21, the ROM 133 stores therein a search target data ID analyzing program 133a, a first searching program 133b, and a second searching program 133c. Similarly as the components of the data collector 30ax that is shown in FIG. 6, the search target data ID analyzing program 133a, the first searching program 133b, and the second searching program 133c can be suitably integrated or broken down.

As shown in FIG. 21, the search target data ID analyzing program 133a, the first searching program 133b, and the second searching program 133c are read by the CPU 132 from the ROM 133 and executed, thus causing the search target data ID analyzing program 133a, the first searching program 133b, and the second searching program 133c to function as a search target data ID analyzing process 132a, a first searching process 132b, and a second searching process 132c. The search target data ID analyzing process 132a, the first searching process 132b, and the second searching process 132c respectively correspond to the search target data ID analyzer 91, the first searching unit 92, and the second searching unit 93 that are shown in FIG. 6.

As shown in FIG. 21, the HDD 134 includes a reference table 134a. The reference table 134a corresponds to the reference table storage unit 81 that is shown in FIG. 6.

The search target data ID analyzing program 133a, the first searching program 133b, and the second searching program 133c need not be stored in the ROM 133 from the beginning. For example, the search target data ID analyzing program 133a, the first searching program 133b, and the second searching program 133c can be stored in a "portable physical medium" such as a flexible disk (FD), a compact disk-read only memory (CD-ROM), a magneto optic (MO) disk, a digital versatile disk (DVD), an integrated circuit (IC) card etc. that can be inserted into the computer 130, a "fixed physical medium" such as an HDD that can be arranged inside or outside the computer 130, or "another computer (or server)" that is connected to the computer 130 via a public line, Internet, a LAN, a wide area network (WAN) etc. The search target data ID analyzing program 133*a*, the first searching program 133*b*, and the second searching program 133*c* can be read by the computer 130 from the media and executed.

According to an embodiment of the present invention, a searching process can be carried out efficiently. In other words, data collectors share in a shared storage device, a search history that is a result of searches carried out previously. Before accessing data controllers, the data collectors access and search the shared storage device, thereby enabling to prevent a search overlap. Thus, the searching process can be efficiently carried out.

According to an embodiment of the present invention, the searching process can be carried out further efficiently. In other words, when latest search target data is successively added to the data controllers, the data collectors use a predetermined identification data as a representative identification data, periodically prior retrieve the search target data, and share the search history in the shared storage device. Before accessing the data controllers, the data collectors access the shared storage device, thereby enabling to prevent the search overlap and enabling to carry out the searching process further efficiently.

According to an embodiment of the present invention, a time period required for the searching process when the data collectors search the shared storage device can be reduced. In other words, preventing an increase of the search target data that is stored in the shared storage device enables to reduce the time period required for the searching process when the data collectors search the shared storage device.

According to an embodiment of the present invention, a data collector can be removed from a network control system or a data controller can be newly embedded into the network control system without causing an erroneous operation.

According to an embodiment of the present invention, a pressure on a resource of the shared storage device can be prevented.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A network control system comprising:
   a data controller that stores therein search target data representing a search target;
   a request terminal that outputs identification data uniquely identifying the search target data and retrieves the search target data corresponding to the identification data;
   a plurality of data collectors that retrieve the search target data from the data controller by using the identification data output from the request terminal;
   a load-dispersing device that relays the identification data and the search target data between the request terminal and the data collectors; and
   a shared storage device that receives the identification data and the search target data from the data collectors and establishes and stores therein a correspondence between the identification data and the search target data, wherein
   each of the data collectors includes
      a shared storage device searching unit that searches the shared storage device by using the identification data received from the load-dispersing device, the shared storage device searching unit retrieving the search target data from the shared storage device, and transmitting the retrieved search target data to the load-dispersing device, when the search target data corresponding to the identification data is stored in the shared storage device;
      a data controller searching unit that searches the data controller by using the identification data, retrieves the search target data corresponding to the identification data, and transmits the retrieved search target data to the load-dispersing device, when the search target data is not stored in the shared storage device at the time of searching by the shared storage device searching unit; and
      a storage requesting unit that transmits to the shared storage device, the search target data retrieved by the data controller searching unit and the identification data corresponding to the search target data, and requests the shared storage device to establish and store therein a correspondence between the search target data and the identification data.

2. The network control system according to claim 1, wherein the data collectors further includes
   a representative identification data storage unit that stores therein as representative identification data, the identification data that is used by the data controller searching unit to search the data controllers; and
   a periodic searching unit that periodically searches the data controller and retrieves the search target data corresponding to the representative identification data stored by the representative identification data storage unit, wherein
   the storage requesting unit transmits to the shared storage device, the search target data that retrieved by the periodic searching unit and the identification data corresponding to the search target data, and requests the shared storage device to establish and store therein a correspondence between the search target data and the identification data.

3. The network control system according to claim 2, wherein the data controller further comprising:
   a determining unit that monitors, for the identification data stored by the representative identification data storage unit, a receipt status of the identification data from the load-dispersing device, and determines a necessity of a periodic search by using the identification data;
   an identification data controller that deletes from the representative identification data storage unit, the identification data that is determined as unnecessary by the determining unit; and
   a shared storage device-controller that requests the shared storage device to delete the identification data that is determined as unnecessary by the determining unit and the search target data corresponding to the identification data.

4. The network control system according to claim 3, wherein the load-dispersing device further include
   a device identification data storage unit that stores therein device identification data that uniquely identifies a data collector that is a current target for transmission of the identification data;
   a device identification data controller that adds the device identification data to the device identification data storage unit and deletes the device identification data from the device identification data storage unit; and a distributing unit that distributes the identification data to the data collector in accordance with the device identification data stored by the device identification data storage unit.

5. The network control system according to claim 1, wherein the storage requesting unit stores, in a storage location different from the shared storage device, the search target data retrieved by the data controller searching unit, transmits to the shared storage device, the identification data corresponding to the search target data and address data indicating the storage location, and requests the shared storage device to establish and store therein a correspondence between the identification data and the address data;

the shared storage device searching unit searches the shared storage device by using the identification data received from the load-dispersing device, the shared storage device searching unit retrieving, the search target data from the storage location indicated by the address data, and transmits the retrieved search target data to the load-dispersing device, when the address data corresponding to the identification data is stored in the shared storage device; and the data controller searching unit searches the data controller by using the identification data, retrieves the search target data corresponding to the identification data, and transmits the retrieved search target data to the load-dispersing device, when the address data not is stored in the shared storage device at the time of searching by the shared storage device searching unit.

6. A computer-readable recording medium that stores therein a computer program for controlling a network control system, the network control system including a data controller that stores therein search target data representing a search target; a request terminal that outputs identification data uniquely identifying the search target data and retrieves the search target data corresponding to the identification data, a plurality of data collectors that each serves as a computer and that retrieve the search target data from the data controller by using the identification data output from the request terminal; a load-dispersing device that relays the identification data and the search target data between the request terminal and the data collectors; and a shared storage device that receives the identification data and the search target data from the data collectors and establishes and stores therein a correspondence between the identification data and the search target data, the computer program causing the computer to execute:

searching the shared storage device by using the identification data received from the load-dispersing device;

when the search target data corresponding to the identification data is stored in the shared storage device, retrieving the search target data from the shared storage device, and transmitting the retrieved search target data to the load-dispersing device;

when the search target data is not stored in the shared storage device at the time of searching for the shared storage device, searching the data controller by using the identification data, retrieving the search target data corresponding to the identification data from the data controller, and transmitting the retrieved search target data to the load-dispersing device;

transmitting to the shared storage device, the search target data retrieved from the data controller and the identification data corresponding to the search target data; and requesting the shared storage device to establish and store therein a correspondence between the search target data and the identification data.

7. A method for controlling a network control system, the network control system including a data controller that stores therein search target data representing a search target; a request terminal that outputs identification data uniquely identifying the search target data and retrieves the search target data corresponding to the identification data, a plurality of data collectors that retrieve the search target data from the data controller by using the identification data output from the request terminal; a load-dispersing device that relays the identification data and the search target data between the request terminal and the data collectors; and a shared storage device that receives the identification data and the search target data from the data collectors and establishes and stores therein a correspondence between the identification data and the search target data, the method comprising:

searching the shared storage device by using the identification data received from the load-dispersing device;

when the search target data corresponding to the identification data is stored in the shared storage device, retrieving the search target data from the shared storage device, and transmitting the retrieved search target data to the load-dispersing device;

when the search target data is not stored in the shared storage device at the time of searching for the shared storage device, searching the data controller by using the identification data, retrieving the search target data corresponding to the identification data from the data controller, and transmitting the retrieved search target data to the load-dispersing device;

transmitting to the shared storage device, the search target data retrieved from the data controller and the identification data corresponding to the search target data; and requesting the shared storage device to establish and store therein a correspondence between the search target data and the identification data.

* * * * *